US009903940B2

(12) United States Patent
Lohier

(10) Patent No.: US 9,903,940 B2
(45) Date of Patent: Feb. 27, 2018

(54) ENTRUSTED DEVICE LOCALIZATION SCHEME USING ULTRASOUND SIGNATURES

(71) Applicant: QUALCOMM Incorporated, San Diego, CA (US)

(72) Inventor: Frantz Lohier, El Cerrito, CA (US)

(73) Assignee: QUALCOMM Incorporated, San Diego, CA (US)

(*) Notice: Subject to any disclaimer, the term of this patent is extended or adjusted under 35 U.S.C. 154(b) by 132 days.

(21) Appl. No.: 14/573,466

(22) Filed: Dec. 17, 2014

(65) Prior Publication Data

US 2015/0185311 A1    Jul. 2, 2015

Related U.S. Application Data

(60) Provisional application No. 61/922,069, filed on Dec. 30, 2013.

(51) Int. Cl.
*G01S 5/18* (2006.01)
*G06F 21/88* (2013.01)
(Continued)

(52) U.S. Cl.
CPC ............. *G01S 5/18* (2013.01); *G06F 21/44* (2013.01); *G06F 21/88* (2013.01); *G08B 21/24* (2013.01);
(Continued)

(58) Field of Classification Search
CPC .......... G01S 5/18; G06F 21/88; G08B 21/24; H04M 1/725; H04W 12/08
(Continued)

(56) References Cited

U.S. PATENT DOCUMENTS 4,903,243 A * 2/1990 Turner, Jr. ............. G01S 13/74
367/2
7,525,928 B2    4/2009 Cutler
(Continued)

FOREIGN PATENT DOCUMENTS

EP    2053573 A1    4/2009

OTHER PUBLICATIONS

International Search Report and Written Opinion—PCT/US2014/071254—ISA/EPO—dated Mar. 30, 2015.
(Continued)

*Primary Examiner* — Luke D Ratcliffe
*Assistant Examiner* — Amie M Ndure
(74) *Attorney, Agent, or Firm* — Muncy, Geissler, Olds & Lowe, P.C.

(57) ABSTRACT

The disclosure generally relates to a localization scheme that may use ultrasound signatures exchanged among entrusted devices to locate lost or otherwise misplaced devices. More particularly, a user device may initially exchange an ultrasound signature or other inaudible audio signature with an entrusted device (e.g., during a pairing procedure with the entrusted device) and subsequently search an ultrasound domain in response to detecting an inactive state (e.g., based on measurements that indicate inflicted motion or processor activity). As such, in response to detecting the initially exchanged ultrasound signature in the ultrasound domain, which may be emitted from the entrusted device or an unpaired device that has been authorized to emit the ultrasound signature, the user device may generate an audible or visual notification in a user domain and optionally further enable more sophisticated user notification and localization tasks to assist in locating the user device.

27 Claims, 14 Drawing Sheets

(51) Int. Cl.
*H04W 12/08* (2009.01)
*G06F 21/44* (2013.01)
*G08B 21/24* (2006.01)
*H04M 1/725* (2006.01)

(52) U.S. Cl.
CPC ....... *H04M 1/72572* (2013.01); *H04W 12/08* (2013.01); *G06F 2221/2111* (2013.01)

(58) Field of Classification Search
USPC ........................................................ 367/118
See application file for complete search history.

(56) References Cited

U.S. PATENT DOCUMENTS

| | | | |
|---|---|---|---|
| 7,783,281 | B1 | 8/2010 | Cook et al. |
| 7,942,936 | B2 | 5/2011 | Golden |
| 7,973,657 | B2 | 7/2011 | Ayed |
| 8,207,316 | B1* | 6/2012 | Bentwich .............. C07K 14/005 435/375 |
| 8,823,494 | B1 | 9/2014 | Kovitz et al. |
| 9,367,663 | B2* | 6/2016 | Deciu ..................... G06F 19/18 700/1 |
| 2006/0265508 | A1* | 11/2006 | Angel ............... H04L 29/12047 709/230 |
| 2007/0128899 | A1* | 6/2007 | Mayer ................... G06F 9/4406 439/152 |
| 2008/0177994 | A1* | 7/2008 | Mayer ................... G06F 9/4418 713/2 |
| 2009/0318773 | A1* | 12/2009 | Jung .................. A61B 5/04009 600/300 |
| 2010/0145622 | A1* | 6/2010 | Haque ..................... G01V 1/16 702/14 |
| 2010/0216446 | A1* | 8/2010 | Chang ............... H04M 1/72522 455/418 |
| 2010/0302032 | A1 | 12/2010 | Abed |
| 2011/0301441 | A1* | 12/2011 | Bandic ................ A61B 5/0059 600/306 |
| 2012/0099401 | A1* | 4/2012 | Yamashita .............. G01S 3/808 367/118 |
| 2012/0266221 | A1* | 10/2012 | Castelluccia ......... H04L 9/3271 726/6 |
| 2012/0321759 | A1* | 12/2012 | Marinkovich ....... A61B 5/0531 426/231 |

OTHER PUBLICATIONS

Schweinzer H., et al., "Ultrasonic device localization and its potential for wireless sensor network security", Control Engineering Practice, Pergamon Press, Oxford, GB, vol. 18, No. 8, Aug. 1, 2010 (Aug. 1, 2010), pp. 852-862, XP027172595, ISSN: 0967-0661 [retrieved on Feb. 20, 2009].

* cited by examiner

ENTRUSTED DEVICE LOCALIZATION SCHEME USING ULTRASOUND SIGNATURES

CROSS-REFERENCE TO RELATED APPLICATIONS

The present application for patent claims the benefit of Provisional Patent Application No. 61/922,069 entitled "ENTRUSTED DEVICE LOCALIZATION SCHEME USING ULTRASOUND SIGNATURES," filed Dec. 30, 2013, assigned to the assignee hereof and hereby expressly incorporated herein by reference in its entirety.

TECHNICAL FIELD

Various embodiments described herein generally relate to a localization scheme that may use ultrasound signatures exchanged among entrusted devices to locate lost devices.

BACKGROUND

The Internet is a global system of interconnected computers and computer networks that use a standard Internet protocol suite (e.g., the Transmission Control Protocol (TCP) and Internet Protocol (IP)) to communicate with each other. The Internet of Things (IoT) is based on the idea that everyday objects, not just computers and computer networks, can be readable, recognizable, locatable, addressable, and controllable via an IoT communications network (e.g., an ad-hoc system or the Internet). A number of market trends are driving development of IoT devices. For example, increasing energy costs are driving governments' strategic investments in smart grids and support for future consumption, such as for electric vehicles and public charging stations. Increasing health care costs and aging populations are driving development for remote/connected health care and fitness services. A technological revolution in the home is driving development for new "smart" services, including consolidation by service providers marketing 'N' play (e.g., data, voice, video, security, energy management, etc.) and expanding home networks. Buildings are getting smarter and more convenient as a means to reduce operational costs for enterprise facilities.

There are a number of key applications for the IoT. For example, in the area of home and building automation, smart homes and buildings can have centralized control over virtually any device or system in the home or office. In the field of asset tracking, enterprises and large organizations can accurately track the locations of high-value equipment. Accordingly, increasing development in IoT technologies will lead to numerous IoT devices surrounding a user at home, in vehicles, at work, and many other locations and personal spaces. However, when a user loses or otherwise misplaces a particular device or other physical object (e.g., a smartphone), conventional approaches to locate objects typically employ radio frequency (RF) signals, global positioning system (GPS) schemes, triangulation schemes, or other schemes. Among other disadvantages, these conventional approaches may consume substantial power and thereby interfere with the ability to locate lost or otherwise misplaced objects due to the possibility that resources (e.g., battery power) will be drained before the misplaced objects can be found. Moreover, conventional schemes may lack the ability to locate lost or otherwise misplaced objects in certain environments (e.g., indoor locations where a misplaced device cannot sufficiently receive signals that originate from GPS satellites). Furthermore, conventional localization schemes may pose security risks in the event that a malicious user somehow obtains permission to seek a lost device or disables software that enables the actual owner to locate a lost device. For example, certain smartphones have known software vulnerabilities that can be exploited to enable an airplane mode and thereby sever network connectivity that device recovery services may require to locate a lost device whether or not the lost device has password protection to prevent unauthorized users from bypassing a lock screen.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

According to various aspects, the localization scheme described herein may involve exchanging ultrasound signatures or other suitable audio signatures that may generally be inaudible to users among different user devices such that the exchanged ultrasound or other inaudible audio signatures can subsequently be used to locate the user devices when lost or otherwise misplaced. More particularly, in various embodiments, an entrusted user device may exchange an ultrasound signature or other inaudible audio signature with another user device (e.g., during a pairing procedure), and the user device may subsequently search an ultrasound domain in response to detecting an inactive state (e.g., based on measurements that indicate inflicted motion or processor activity). As such, in response to detecting the initially exchanged ultrasound signature in the searched ultrasound domain, which may be emitted from the entrusted device or another (e.g., unpaired) device that has been authorized to emit the ultrasound signature, the user device may generate an audible or visual notification in a user domain and optionally further enable more sophisticated user notification and localization tasks to assist in locating the user device.

According to various aspects, an entrusted device localization scheme using ultrasound signatures may start when an end user initiates a pairing procedure between an entrusted device and a target device associated with a particular network or other environment (e.g., a household). During the pairing procedure, the entrusted device and the target device may exchange a communication key or other private pre-shared key (PSK), which may include a unique and inaudible ultrasound signature or other suitable unique audio signature that the entrusted device and the target device can emit and detect. The entrusted device and the target device may then monitor respective activity associated therewith to determine whether or not the entrusted device and the target device are in use. For example, in various embodiments, the entrusted device and the target device may include on-board accelerometers or other suitable sensors that can detect inflicted motion or other suitable metrics that may indicate a usage state associated therewith.

In another example, the entrusted device and the target device may monitor activity associated with a processor to determine whether or not the end user may be engaging in activity that may not be indicated via inflicted motion or other suitable motion metrics.

According to various aspects, a device that detects an inactive state may search an ultrasound domain at periodic intervals (e.g., using a built-in microphone) to detect the previously exchanged ultrasound signature. For example, in various embodiments, the end user may use the entrusted device previously paired with the device that detected the inactive state, which may include requesting that the entrusted device emit the previously exchanged ultrasound signature. Alternatively (or additionally), a third party device or another remote device may be granted the ability to locate the target device even though the third party device may not have been paired with the target device (e.g., the ultrasound signature exchanged during the pairing procedure may be transmitted to the third party device, which may then emit the ultrasound signature in substantially the same manner as the entrusted device in order to confirm whether or not the target device was actually misplaced in a location corresponding to the third party device). As such, the target device may search the ultrasound domain to detect the ultrasound signature, and in response thereto, generate an audible or visual notification in a user domain (e.g., a notification that the end user can perceive, whereas the ultrasound signature may be inaudible to the end user). Furthermore, in various embodiments, the target device may enable more sophisticated user notification and localization tasks in response to detecting the ultrasound signature emitted from the entrusted device (e.g., enabling triangulation schemes, reporting a last known GPS location to a trusted entity, etc.).

According to various aspects, a method to locate a device using ultrasound signatures according to the entrusted device localization scheme described herein may comprise exchanging an ultrasound signature with an entrusted device, searching an ultrasound domain in response to detecting an inactive state, and generating a notification in a user domain in response to detecting the ultrasound signature exchanged with the entrusted device in the searched ultrasound domain.

According to various aspects, an apparatus that can implement the entrusted device localization scheme described herein may comprise a microphone, a transceiver configured exchange an ultrasound signature with an entrusted device, one or more sensors configured to detect that the apparatus has an inactive state, and one or more processors configured to activate the microphone to search an ultrasound domain in response to the one or more sensors detecting the inactive state and to generate a notification in a user domain in response to the microphone capturing the ultrasound signature exchanged with the entrusted device in the searched ultrasound domain.

According to various aspects, an apparatus that can implement the entrusted device localization scheme described herein may comprise means for exchanging an ultrasound signature with an entrusted device, means for searching an ultrasound domain in response to detecting an inactive state, and means for generating a notification in a user domain in response to detecting the ultrasound signature exchanged with the entrusted device in the searched ultrasound domain.

According to various aspects, a computer-readable storage medium may have computer-executable instructions recorded thereon, wherein executing the computer-executable instructions on one or more processors may cause the one or more processors to exchange an ultrasound signature with an entrusted device, search an ultrasound domain in response to detecting an inactive state, and generate a notification in a user domain in response to detecting the ultrasound signature in the searched ultrasound domain.

Accordingly, whereas conventional localization schemes that employ RF signals, GPS schemes, or other triangulation schemes may not perform well in certain locations (e.g., indoor environments where satellite signals may be unavailable), the entrusted device localization scheme described herein above may employ ultrasound signals or other audio signatures that can be emitted and detected in indoor environments or other environments where conventional localization signals may not be well suited. Moreover, because the ultrasound signals can be emitted and detected over relatively short ranges in a periodic and/or sporadic manner, the localization scheme disclosed herein may consume substantially less power than conventional localization schemes. Furthermore, the pairing procedure between the entrusted device and the target device may advantageously offer security and privacy because the target device may only generate notifications to indicate or otherwise suggest the location associated therewith in response to detecting ultrasound signatures that were exchanged with paired (trusted) devices. As such, the localization scheme based on ultrasound signatures may pose little to no security risk that someone may use the technology to randomly seek lost devices because unauthorized users would not have any way to learn the unique ultrasound signature.

Other objects and advantages associated with the aspects and embodiments disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

DETAILED DESCRIPTION

Figure 1A:
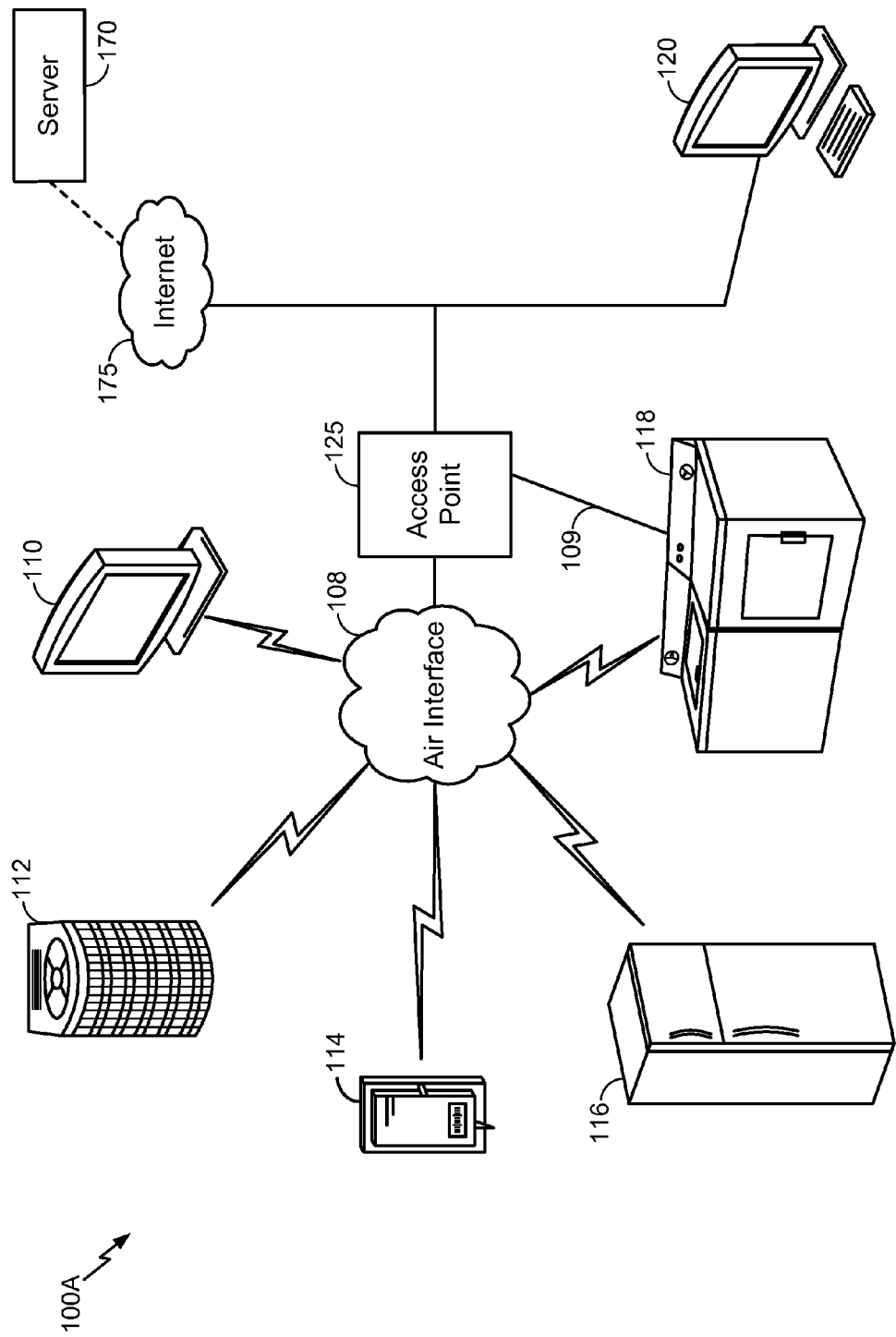
FIG. 1A and FIG. 1B illustrate exemplary high-level system architectures of wireless communications systems, according to various aspects described herein.

Various aspects are disclosed in the following description and related drawings to show specific examples relating to exemplary embodiments. Alternate embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "client device," "user equipment" (or "UE"), "user terminal," "user device," "communication device," "wireless device," "wireless communications device," "handheld device," "mobile device," "mobile terminal," "mobile station," "handset," "access terminal," "subscriber device," "subscriber terminal," "subscriber station," "terminal," and variants thereof are used interchangeably to refer to any suitable mobile or stationary device that may operate that can communicate with a radio access network (RAN) that implements a particular radio access technology (RAT), over a wired network, over a Wi-Fi networks (e.g., based on IEEE 802.11, etc.), and/or with other devices over direct device-to-device (D2D) or peer-to-peer (P2P) connections.

Furthermore, as used herein, the term "Internet of Things device" (or "IoT device") may refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have an active communication interface, such as a modem, a transceiver, a transmitter-receiver, or the like, a passive interface (e.g., a quick response (QR) code, a radio-frequency identification (RFID) tag, an NFC tag, etc.), and/or any suitable combination thereof. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to a personal network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the personal network. IoT devices may also include cell phones, desktop computers, laptop computers, tablet computers, personal digital assistants (PDAs), etc. Accordingly, the personal network may be comprised of a combination of "legacy" Internet-accessible devices (e.g., laptop or desktop computers, cell phones, etc.) in addition to devices that do not typically have Internet-connectivity (e.g., dishwashers, etc.).

FIG. 1A illustrates a high-level system architecture of a wireless communications system 100A in accordance with an aspect of the disclosure. The wireless communications system 100A contains a plurality of devices, which include a television 110, an outdoor air conditioning unit 112, a thermostat 114, a refrigerator 116, and a washer and dryer 118.

Referring to FIG. 1A, the various devices 110-118 are configured to communicate with an access network (e.g., an access point 125) over a physical communications interface or layer, shown in FIG. 1A as air interface 108 and a direct wired connection 109. The air interface 108 can comply with a wireless Internet protocol (IP), such as IEEE 802.11. Although FIG. 1A illustrates various devices 110-118 communicating over the air interface 108 and device 118 communicating over the direct wired connection 109, each device 110-118 may communicate over a wired or wireless connection, or both.

The Internet 175 includes a number of routing agents and processing agents (not shown in FIG. 1A for the sake of convenience). The Internet 175 is a global system of interconnected computers and computer networks that uses a standard Internet protocol suite (e.g., the Transmission Control Protocol (TCP) and IP) to communicate among disparate devices/networks. TCP/IP provides end-to-end connectivity specifying how data should be formatted, addressed, transmitted, routed and received at the destination.

In FIG. 1A, a computer 120, such as a desktop or personal computer (PC), is shown as connecting to the Internet 175 directly (e.g., over an Ethernet connection or Wi-Fi or 802.11-based network). The computer 120 may have a wired connection to the Internet 175, such as a direct connection to a modem or router, which, in an example, can correspond to the access point 125 itself (e.g., for a Wi-Fi router with both wired and wireless connectivity). Alternatively, rather than being connected to the access point 125 and the Internet 175 over a wired connection, the computer 120 may be connected to the access point 125 over air interface 108 or another wireless interface, and access the Internet 175 over the air interface 108. Although illustrated as a desktop computer, computer 120 may be a laptop computer, a tablet computer, a PDA, a smart phone, or the like. The computer 120 may be a user device and/or contain functionality to manage a network and/or group, such as the network/group of devices 110-118.

The access point 125 may be connected to the Internet 175 via, for example, an optical communication system, such as FiOS, a cable modem, a digital subscriber line (DSL) modem, or the like. The access point 125 may communicate with the various devices 110-120 and the Internet 175 using the standard Internet protocols (e.g., TCP/IP).

Referring to FIG. 1A, a server 170 is shown as connected to the Internet 175. The server 170 can be implemented as a plurality of structurally separate servers, or alternately may correspond to a single server. In an aspect, the server 170 is optional (as indicated by the dotted line), and the group of devices 110-120 may be a peer-to-peer (P2P) network. In such a case, the devices 110-120 can communicate with each other directly over the air interface 108 and/or the direct wired connection 109. Alternatively, or additionally, some or all of the various devices 110-120 may be configured with a communication interface independent of air interface 108 and direct wired connection 109. For example, if the air interface 108 corresponds to a Wi-Fi interface, one or more of the devices 110-120 may have Bluetooth or NFC interfaces for communicating directly with each other or other Bluetooth or NFC-enabled devices.

In a peer-to-peer network, service discovery schemes can multicast the presence of nodes, their capabilities, and group membership. The peer-to-peer devices can establish associations and subsequent interactions based on this information.

Figure 1B:
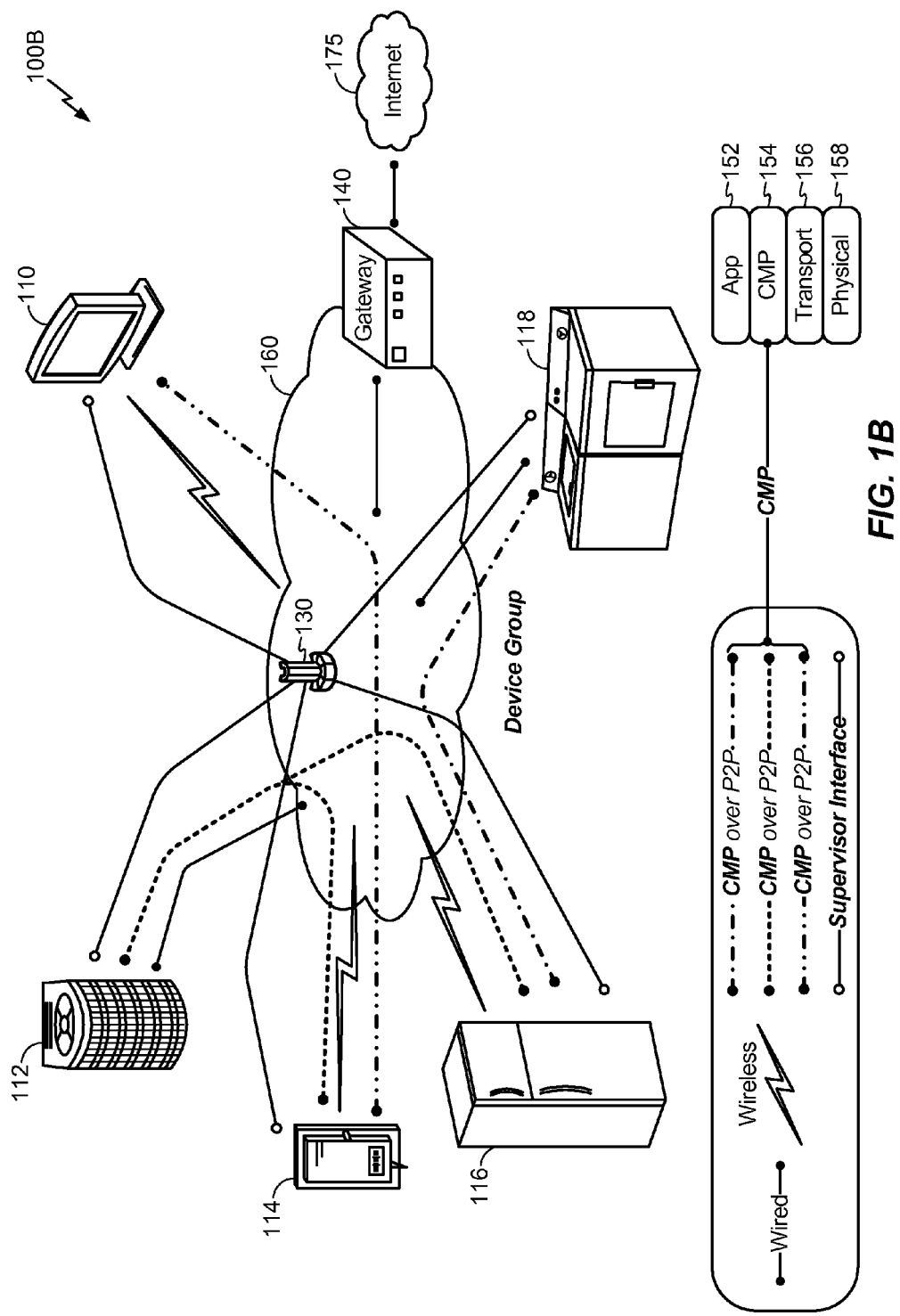

In accordance with an aspect of the disclosure, FIG. 1B illustrates a high-level architecture of another wireless communications system 100B that contains a plurality of devices. In general, the wireless communications system 100B shown in FIG. 1B may include various components that are the same and/or substantially similar to the wireless communications system 100A shown in FIG. 1A, which was described in greater detail above (e.g., various devices, including a computer 110, outdoor air conditioning unit 112, thermostat 114, refrigerator 116, and washer and dryer 118, that are configured to communicate with one another over an air interface and/or a direct wired connection, with a gateway 140 that provides connectivity to the Internet 175, and/or an access point 130 or other supervisor node that bridges connections among the various other nodes in the wireless communications system 100B. As such, for brevity and ease of description, various details relating to certain components in the wireless communications system 100B shown in FIG. 1B may be omitted herein to the extent that the same or similar details have already been provided above in relation to FIG. 1A.

Referring to FIG. 1B, the wireless communications system 100B may include a supervisor device 130, which may alternatively be referred to as an access point 130, manager 130, or manager device 130. As such, where the following description uses the term "supervisor device" 130, those skilled in the art will appreciate that any references to a manager, manager device, access point, group owner, or similar terminology may refer to the supervisor device 130 or another physical or logical component that provides the same or substantially similar functionality.

In one embodiment, the supervisor device 130 may generally observe, monitor, control, or otherwise manage the various other components in the wireless communications system 100B. For example, the supervisor device 130 can communicate with an access network over air interface and/or a direct wired connection to monitor or manage attributes, activities, or other states associated with the various devices 110-118 in the wireless communications system 100B. The supervisor device 130 may have a wired or wireless connection to the Internet 175 or connect to the Internet 175 through the gateway 140. The supervisor device 130 may obtain information from the Internet 175 that can be used to further monitor or manage attributes, activities, or other states associated with the various devices 110-118. The supervisor device 130 may be a standalone device or one of devices 110-118, such as computer 110. The supervisor device 130 may be a physical device or a software application running on a physical device. The supervisor device 130 may include a user interface that can output information relating to the monitored attributes, activities, or other states associated with the devices 110-118 and receive input information to control or otherwise manage the attributes, activities, or other states associated therewith. Accordingly, the supervisor device 130 may generally include various components and support various wired and wireless communication interfaces to observe, monitor, control, or otherwise manage the various components in the wireless communications system 100B.

According to various aspects, the communications system 100B shown in FIG. 1B illustrates exemplary peer-to-peer communications between the devices 110-118 and the supervisor device 130. As shown in FIG. 1B, the supervisor device 130 communicates with each of the devices 110-118 over a supervisor interface. Further, devices 110 and 114, devices 112, 114, and 116, and devices 116 and 118, communicate directly with each other.

The devices 110-118 make up a group 160, which may include a group of locally connected devices, such as the devices connected to a user's home network. Although not shown, multiple device groups may be connected to and/or communicate with each other via the gateway 140 connected to the Internet 175. At a high level, the supervisor device 130 manages intra-group communications, while the gateway 140 can manage inter-group communications. Although shown as separate devices, the supervisor device 130 and the gateway 140 may be, or reside on, the same device (e.g., a standalone device or a device, such as computer 110). Alternatively, the gateway 140 may correspond to or include the functionality of an access point. As yet another alternative, the gateway 140 may correspond to or include the functionality of a server, such as the server 170 in FIG. 1A.

Each device 110-118 can treat the supervisor device 130 as a peer and transmit attribute/schema updates to the supervisor device 130. When a device needs to communicate with another device, it can request the pointer to that device from the supervisor device 130 and then communicate with the target device as a peer. The devices 110-118 communicate with each other over a peer-to-peer communication network using a common messaging protocol (CMP). As long as two devices are CMP-enabled and connected over a common communication transport, they can communicate with each other. In the protocol stack, the CMP layer 154 is below the application layer 152 and above the transport layer 156 and the physical layer 158.

Figure 2:
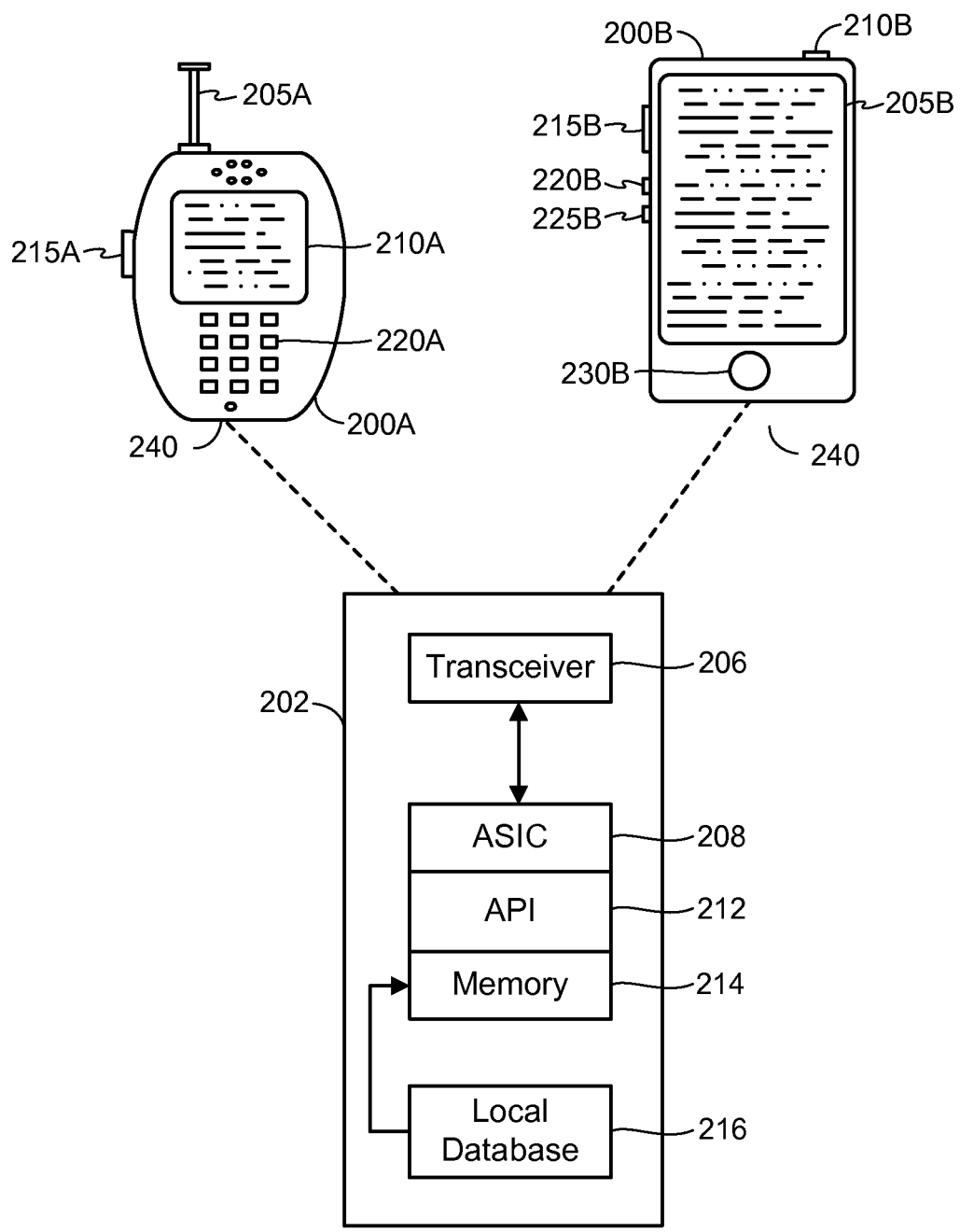
FIG. 2 illustrates exemplary wireless devices that may be used in an entrusted device localization scheme, according to various aspects described herein.

According to various aspects, FIG. 2 illustrates exemplary wireless devices that may be used in an entrusted device localization scheme. In particular, in FIG. 2, wireless device 200A is illustrated as a telephone and wireless device 200B is illustrated as a touchscreen device (e.g., a smart phone, a tablet computer, etc.). As shown in FIG. 2, an external casing of wireless device 200A is configured with an antenna 205A, display 210A, at least one button 215A (e.g., a power button, a volume control button, etc.) and a keypad 220A among other components, as is known in the art. Also, an external casing of wireless device 200B is configured with a touchscreen display 205B, peripheral buttons 210B, 212B, 220B and 225B (e.g., a power control button, a volume or vibrate control button, an airplane mode toggle button, etc.), at least one front-panel button 230B (e.g., a Home button, etc.), among other components, as is known in the art. In various embodiments, the button 215A and/or other peripheral buttons 210B, 215B, 220B and 225B may be used to open direct communication to a target device. However, those skilled in the art will appreciate that other devices and methods can be alternately used to engage in communication, such as a "soft key" on touch screen display 205B, other methods as known in the art.

In various embodiments, while not shown explicitly as part of wireless device 200B, the wireless device 200B can include one or more external antennas and/or one or more integrated antennas that are built into the external casing of wireless device 200B, including but not limited to Wi-Fi antennas, cellular antennas, satellite position system (SPS) antennas (e.g., global positioning system (GPS) antennas), and so on, and the wireless device 200A may likewise include one or more external and/or integrated antennas in addition to the antenna 205A. In any case, the one or more external and/or integrated antennas (including at least the antenna 205A) can be used to open a direct communication channel with the wireless devices 200A and/or 200B and thereby provide a direct communication interface to the wireless devices 200A and/or 200B, wherein the direct communication interface may typically comprise hardware known to those skilled in the art. Furthermore, in various embodiments, the direct communication interface can integrate with standard communication interfaces associated with wireless devices 200A and/or 200B that are ordinarily used to carry voice and data transmitted to and from the wireless devices 200A and/or 200B.

Furthermore, although internal components of wireless device 200A and wireless device 200B can be embodied with different hardware configurations, FIG. 2 shows a platform 202 that may provide a basic high-level configuration for internal hardware components associated with wireless devices 200A and/or 200B. In particular, the platform 202 can generally receive and execute software applications, data and/or commands transmitted from a cellular network that may ultimately come from the core network, the Internet, and/or other remote servers and networks (e.g., an application server, web URLs, etc.). The platform 202 can also independently execute locally stored applications without cellular network interaction. The platform 202 can include a transceiver 206 coupled to an application specific integrated circuit (ASIC) 208, or other processor, microprocessor, logic circuit, or other data processing device. The ASIC 208 or other processor executes the application programming interface (API) 212 layer that interfaces with any application environment resident in the memory 214, which can include the operating system loaded on the ASIC 208 and/or any other resident programs in the memory 214 (e.g., the "binary runtime environment for wireless" (BREW) wireless device software platform developed by QUALCOMM®). The memory 214 can be comprised of read-only memory (ROM) or random-access memory (RAM), electrically erasable programmable ROM (EEPROM), flash cards, or any memory common to computer platforms. The platform 202 also can include a local database 216 that can store applications not actively used in memory 214, as well as other data. The local database 216 is typically a flash memory cell, but can be any secondary storage device as known in the art, such as magnetic media, EEPROM, optical media, tape, soft or hard disk, or the like.

Accordingly, an aspect of the disclosure can include wireless devices 200A, 200B, etc. that have the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 214, API 212 and local database 216 may all be used cooperatively to load, store and execute the various functions disclosed herein and thus the logic to perform these functions may be distributed over various elements. Alternatively, the functionality could be incorporated into one discrete component. Furthermore, certain wireless devices that may be used in the various embodiments disclosed herein may not include certain components and/or functionalities associated with the wireless devices 200A and 200B shown in FIG. 2. Therefore, those skilled in the art will appreciate that the features associated with the wireless devices 200A and 200B shown in FIG. 2 are merely illustrative and the disclosure is not limited to the illustrated features or arrangements.

The wireless communication between the wireless devices 200A and/or 200B can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the wireless devices 200A and/or 200B from and using various networks and network configurations. Accordingly, the illustrations provided herein are not intended to limit the aspects of the disclosure and are merely to aid in the description of various aspects disclosed herein.

Additionally, in various embodiments, the wireless devices 200A and/or 200B may include a microphone 240 that can be used to receive and/or detect an ultrasound signature or other audio signature used in the entrusted device localization scheme described herein. Furthermore, in various embodiments, the wireless devices 200A and/or 200B may include one or more sensors (not shown) that can detect inflicted motion or other suitable metrics that may indicate a usage state associated with the wireless devices 200A and/or 200B. In another example, activity associated with the platform 202 may be monitored to determine whether or not an end user is engaging in activity that may not be indicated via inflicted motion or other suitable motion metrics that can be detected with the sensors. In either case, the usage state associated with the wireless devices 200A and/or 200B can be monitored such that the microphone 240 or another suitable audio capture input mechanism can be activated in response to the monitored activity indicating an inactive state such that an ultrasound domain may be searched to detect the ultrasound signature or other audio signature used in the entrusted device localization scheme described herein and generate one or more notifications in a user domain to thereby assist with locating the wireless devices 200A and/or 200B.

Figure 3:
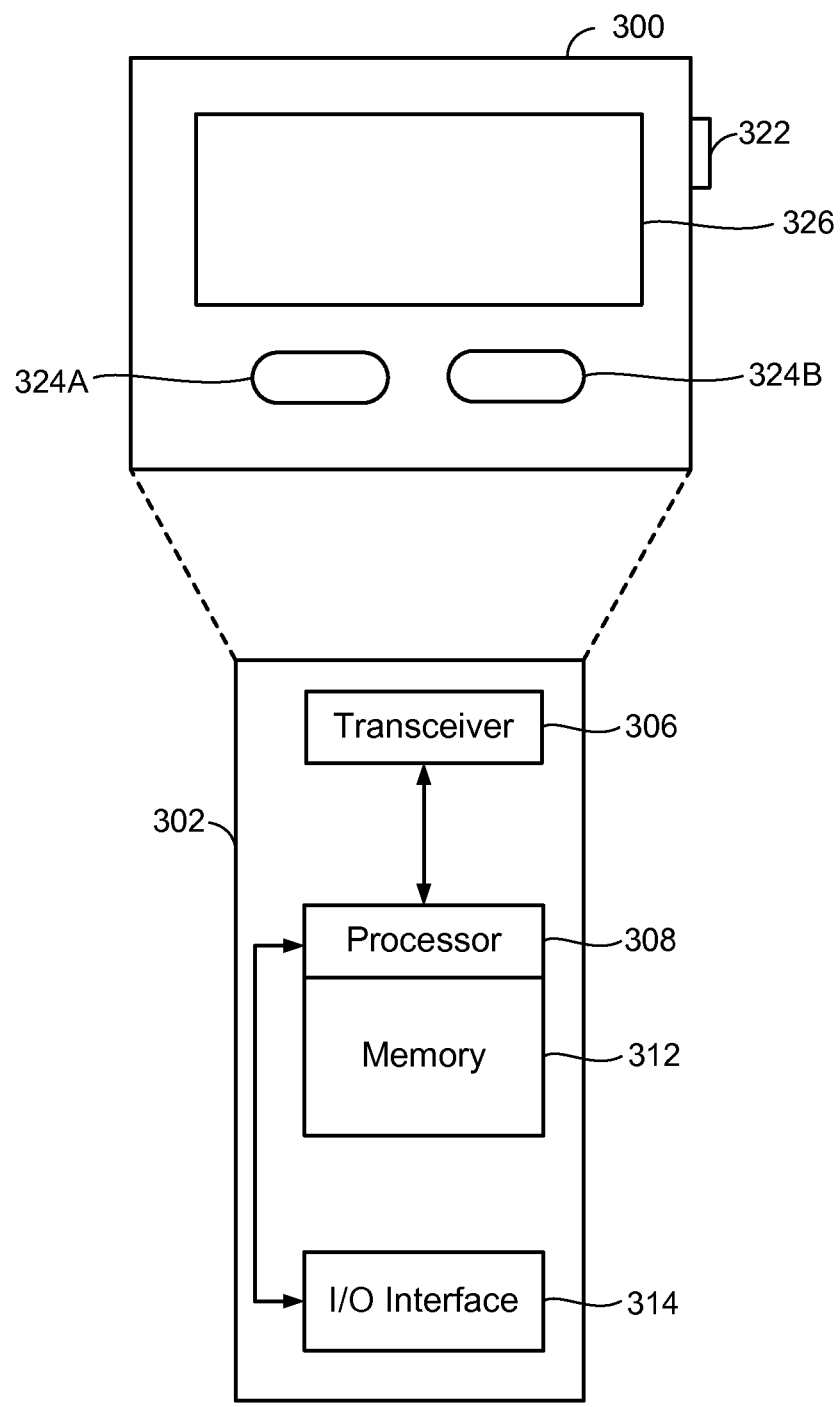
FIG. 3 illustrates another exemplary device that may be used in an entrusted device localization scheme, according to various aspects described herein.

According to various aspects described herein, FIG. 3 illustrates another exemplary wireless device 300 that may be used in an entrusted device localization scheme. While external appearances and/or internal components can differ significantly among wireless devices, most wireless devices will have some sort of user interface, which may comprise a display and a means for user input. Devices without a user interface can be communicated with remotely over a wired or wireless network.

As shown in FIG. 3, in an example configuration for the wireless device 300, an external casing of the wireless device 300 may be configured with a display 326, a power button 322, and two control buttons 324A and 324B, among other components, as is known in the art. The display 326 may be a touchscreen display, in which case the control buttons 324A and 324B may not be necessary. While not shown explicitly as part of the wireless device 300, the wireless device 300 may include one or more external antennas and/or one or more integrated antennas that are built into the external casing, including but not limited to Wi-Fi antennas, cellular antennas, satellite position system (SPS) antennas (e.g., global positioning system (GPS) antennas), and so on.

While internal components of various devices, such as the wireless device 300, can be embodied with different hardware configurations, a basic high-level configuration for internal hardware components is shown as platform 302 in FIG. 3. The platform 302 can receive and execute software applications, data and/or commands transmitted over a network interface, such as air interface 108 in FIGS. 1A-1B and/or a wired interface. The platform 302 can also independently execute locally stored applications. The platform 302 can include one or more transceivers 306 configured for wired and/or wireless communication (e.g., a Wi-Fi transceiver, a Bluetooth transceiver, a cellular transceiver, a satellite transceiver, a GPS or SPS receiver, etc.) operably coupled to one or more processors 308, such as a microcontroller, microprocessor, application specific integrated circuit, digital signal processor (DSP), programmable logic circuit, or other data processing device, which will be generally referred to as processor 308. The processor 308 can execute application programming instructions within a memory 312 of the device. The memory 312 can include one or more of read-only memory (ROM), random-access memory (RAM), electrically erasable programmable ROM (EEPROM), flash cards, or any memory common to computer platforms. One or more input/output (I/O) interfaces 314 can be configured to allow the processor 308 to communicate with and control from various I/O devices such as the display 326, power button 322, control buttons 324A and 324B as illustrated, and any other devices, such as sensors, actuators, relays, valves, switches, and the like associated with the wireless device 300.

Accordingly, an aspect of the disclosure can include a device (e.g., the wireless device 300) including the ability to perform the functions described herein. As will be appreciated by those skilled in the art, the various logic elements can be embodied in discrete elements, software modules executed on a processor (e.g., processor 308) or any combination of software and hardware to achieve the functionality disclosed herein. For example, transceiver 306, processor 308, memory 312, and I/O interface 314 may all be used cooperatively to load, store and execute the various functions disclosed herein and thus the logic to perform these functions may be distributed over various elements. Alternatively, the functionality could be incorporated into one discrete component. Therefore, the features of the wireless device 300 in FIG. 3 are to be considered merely illustrative and the disclosure is not limited to the illustrated features or arrangement.

IP based technologies and services have become more mature, driving down the cost and increasing availability of IP. This has allowed Internet connectivity to be added to more and more types of everyday electronic objects, whereby everyday electronic objects and not just computers and computer networks can be readable, recognizable, locatable, addressable, and controllable via the Internet. In general, with the development and increasing prevalence of IP based technologies, numerous heterogeneous devices that perform different activities and interact with one another in many different ways will surround a user at home, in vehicles, at work, and many other locations and personal spaces. However, when a user loses or otherwise misplaces a particular device or other physical object (e.g., a smartphone), conventional approaches to locate objects typically employ RF signals, GPS schemes, or other triangulation schemes that can consume substantial power and thereby interfere with the ability to locate lost or otherwise misplaced objects due to the possibility that battery power or other resources will be drained before the misplaced objects can be found in addition to posing certain security risks and/or difficulties when attempting to locate lost or otherwise misplaced objects in certain environments (e.g., indoor environments where satellite signals may not be available).

Accordingly, the following description provides a localization scheme that may advantageously leverage ultrasound signals that many smartphones and other devices can emit and receive and thereby enable entrusted devices to locate a device that may be lost or otherwise misplaced. More particularly, a user device may initially exchange an ultrasound signature or other inaudible audio signature with an entrusted device (e.g., during a pairing procedure) and subsequently search an ultrasound domain in response to detecting an inactive state (e.g., based on measurements that indicate inflicted motion or processor activity). As such, in response to detecting the ultrasound signature in the ultrasound domain, which may be emitted from the entrusted device or an unpaired device that has been authorized to emit the ultrasound signature, the user device may generate an audible or visual notification in a user domain and/or enable more sophisticated user notification and localization tasks to assist in locating the user device. However, due to the potentially large number of heterogeneous devices and other physical objects that can be used in the entrusted device localization scheme, well-defined and reliable communication interfaces may be helpful with connecting the various heterogeneous devices such that the devices can be appropriately configured, managed, and communicate with one another to exchange information (e.g., the ultrasound signature used to locate a misplaced target device). Accordingly, the following description provided in relation to FIGS. 4-7 generally outlines an exemplary communication framework that may support discoverable peer-to-peer (P2P) services to enable communication among heterogeneous devices in a distributed programming environment as disclosed herein.

Figure 4:
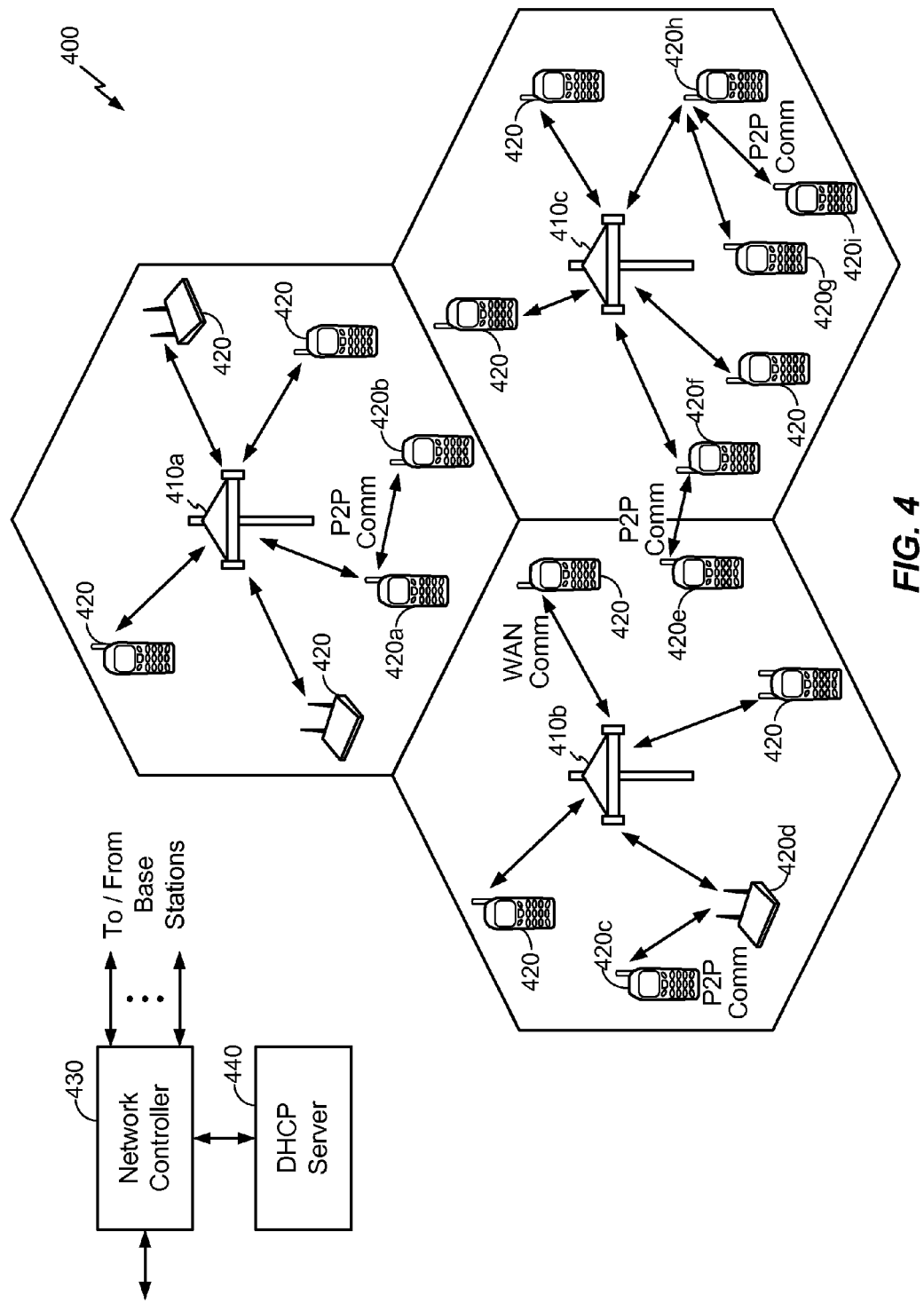
FIG. 4 illustrates a wireless communication network that may support discoverable peer-to-peer (P2P) services that can be used in an entrusted device localization scheme, according to various aspects described herein.

In general, user equipment (UE) (e.g., telephones, tablet computers, laptop and desktop computers, vehicles, etc.), can be configured to connect with one another locally (e.g., Bluetooth, local Wi-Fi, etc.), remotely (e.g., via cellular networks, through the Internet, etc.), or according to suitable combinations thereof. Furthermore, certain UEs may also support proximity-based peer-to-peer (P2P) communication using certain wireless networking technologies (e.g., Wi-Fi, Bluetooth, Wi-Fi Direct, etc.) that support one-to-one connections or simultaneously connections to a group that includes several devices directly communicating with one another. To that end, FIG. 4 illustrates an exemplary wireless communication network or WAN 400 that may support discoverable P2P services, wherein the wireless communication network 400 may comprise an LTE network or another suitable WAN that includes various base stations 410 and other network entities. For simplicity, only three base stations 410a, 410b and 410c, one network controller 430, and one Dynamic Host Configuration Protocol (DHCP) server 440 are shown in FIG. 4. A base station 410 may be an entity that communicates with devices 420 and may also be referred to as a Node B, an evolved Node B (eNB), an access point, etc. Each base station 410 may provide communication coverage for a particular geographic area and may support communication for the devices 420 located within the coverage area. To improve network capacity, the overall coverage area of a base station 410 may be partitioned into multiple (e.g., three) smaller areas, wherein each smaller area may be served by a respective base station 410. In 3GPP, the term "cell" can refer to a coverage area of a base station 410 and/or a base station subsystem 410 serving this coverage area, depending on the context in which the term is used. In 3GPP2, the term "sector" or "cell-sector" can refer to a coverage area of a base station 410 and/or a base station subsystem 410 serving this coverage area. For clarity, the 3GPP concept of "cell" may be used in the description herein.

A base station 410 may provide communication coverage for a macro cell, a pico cell, a femto cell, and/or other cell types. A macro cell may cover a relatively large geographic area (e.g., several kilometers in radius) and may allow unrestricted access by devices 420 with service subscription. A pico cell may cover a relatively small geographic area and may allow unrestricted access by devices 420 with service subscription. A femto cell may cover a relatively small geographic area (e.g., a home) and may allow restricted access by devices 420 having association with the femto cell (e.g., devices 420 in a Closed Subscriber Group (CSG)). In the example shown in FIG. 4, wireless network 400 includes macro base stations 410a, 410b and 410c for macro cells. Wireless network 400 may also include pico base stations 410 for pico cells and/or home base stations 410 for femto cells (not shown in FIG. 4).

Network controller 430 may couple to a set of base stations 410 and may provide coordination and control for these base stations 410. Network controller 430 may be a single network entity or a collection of network entities that can communicate with the base stations via a backhaul. The base stations may also communicate with one another, e.g., directly or indirectly via wireless or wireline backhaul. DHCP server 440 may support P2P communication, as described below. DHCP server 440 may be part of wireless network 400, external to wireless network 400, run via Internet Connection Sharing (ICS), or any suitable combination thereof. DHCP server 440 may be a separate entity (e.g., as shown in FIG. 4) or may be part of a base station 410, network controller 430, or some other entity. In any case, DHCP server 440 may be reachable by devices 420 desiring to communicate peer-to-peer.

Devices 420 may be dispersed throughout wireless network 400, and each device 420 may be stationary or mobile. A device 420 may also be referred to as a node, user equipment (UE), a station, a mobile station, a terminal, an access terminal, a subscriber unit, etc. A device 420 may be a cellular phone, a personal digital assistant (PDA), a wireless modem, a wireless communication device, a handheld device, a laptop computer, a cordless phone, a wireless local loop (WLL) station, a smart phone, a netbook, a smartbook, a tablet, etc. A device 420 may communicate with base stations 410 in the wireless network 400 and may further communicate peer-to-peer with other devices 420. For example, as shown in FIG. 4, devices 420a and 420b may communicate peer-to-peer, devices 420c and 420d may communicate peer-to-peer, devices 420e and 420f may communicate peer-to-peer, and devices 420g, 420h, and 420i may communicate peer-to-peer, while remaining devices 420 may communicate with base stations 410. As further shown in FIG. 4, devices 420a, 420d, 420f, and 420h may also communicate with base stations 400, e.g., when not engaged in P2P communication or possibly concurrent with P2P communication.

In the description herein, WAN communication may refer to communication between a device 420 and a base station 410 in wireless network 400, e.g., for a call with a remote entity such as another device 420. A WAN device is a device 420 that is interested or engaged in WAN communication. P2P communication refers to direct communication between two or more devices 420, without going through any base station 410. A P2P device is a device 420 that is interested or engaged in P2P communication, e.g., a device 420 that has traffic data for another device 420 within proximity of the P2P device. Two devices may be considered to be within proximity of one another, for example, if each device 420 can detect the other device 420. In general, a device 420 may communicate with another device 420 either directly for P2P communication or via at least one base station 410 for WAN communication.

In one embodiment, direct communication between P2P devices 420 may be organized into P2P groups. More particularly, a P2P group generally refers to a group of two or more devices 420 interested or engaged in P2P communication and a P2P link refers to a communication link for a P2P group. Furthermore, in one embodiment, a P2P group may include one device 420 designated a P2P group owner (or a P2P server) and one or more devices 420 designated P2P clients that are served by the P2P group owner. The P2P group owner may perform certain management functions such as exchanging signaling with a WAN, coordinating data transmission between the P2P group owner and P2P clients, etc. For example, as shown in FIG. 4, a first P2P group includes devices 420*a* and 420*b* under the coverage of base station 410*a*, a second P2P group includes devices 420*c* and 420*d* under the coverage of base station 410*b*, a third P2P group includes devices 420*e* and 420*f* under the coverage of different base stations 410*b* and 410*c*, and a fourth P2P group includes devices 420*g*, 420*h* and 420*i* under the coverage of base station 410*c*. Devices 420*a*, 420*d*, 420*f*, and 420*h* may be P2P group owners for their respective P2P groups and devices 420*b*, 420*c*, 420*e*, 420*g*, and 420*i* may be P2P clients in their respective P2P groups. The other devices 420 in FIG. 4 may be engaged in WAN communication.

In one embodiment, P2P communication may occur only within a P2P group and may further occur only between the P2P group owner and the P2P clients associated therewith. For example, if two P2P clients within the same P2P group (e.g., devices 420*g* and 420*i*) desire to exchange information, one of the P2P clients may send the information to the P2P group owner (e.g., device 420*h*) and the P2P group owner may then relay transmissions to the other P2P client. In one embodiment, a particular device 420 may belong to multiple P2P groups and may behave as either a P2P group owner or a P2P client in each P2P group. Furthermore, in one embodiment, a particular P2P client may belong to only one P2P group or belong to multiple P2P group and communicate with P2P devices 420 in any of the multiple P2P groups at any particular moment. In general, communication may be facilitated via transmissions on the downlink and uplink. For WAN communication, the downlink (or forward link) refers to the communication link from base stations 410 to devices 420, and the uplink (or reverse link) refers to the communication link from devices 420 to base stations 410. For P2P communication, the P2P downlink refers to the communication link from P2P group owners to P2P clients and the P2P uplink refers to the communication link from P2P clients to P2P group owners. In certain embodiments, rather than using WAN technologies to communicate P2P, two or more devices may form smaller P2P groups and communicate P2P on a wireless local area network (WLAN) using technologies such as Wi-Fi, Bluetooth, or Wi-Fi Direct. For example, P2P communication using Wi-Fi, Bluetooth, Wi-Fi Direct, or other WLAN technologies may enable P2P communication between two or more mobile phones, game consoles, laptop computers, or other suitable communication entities.

Figure 5:
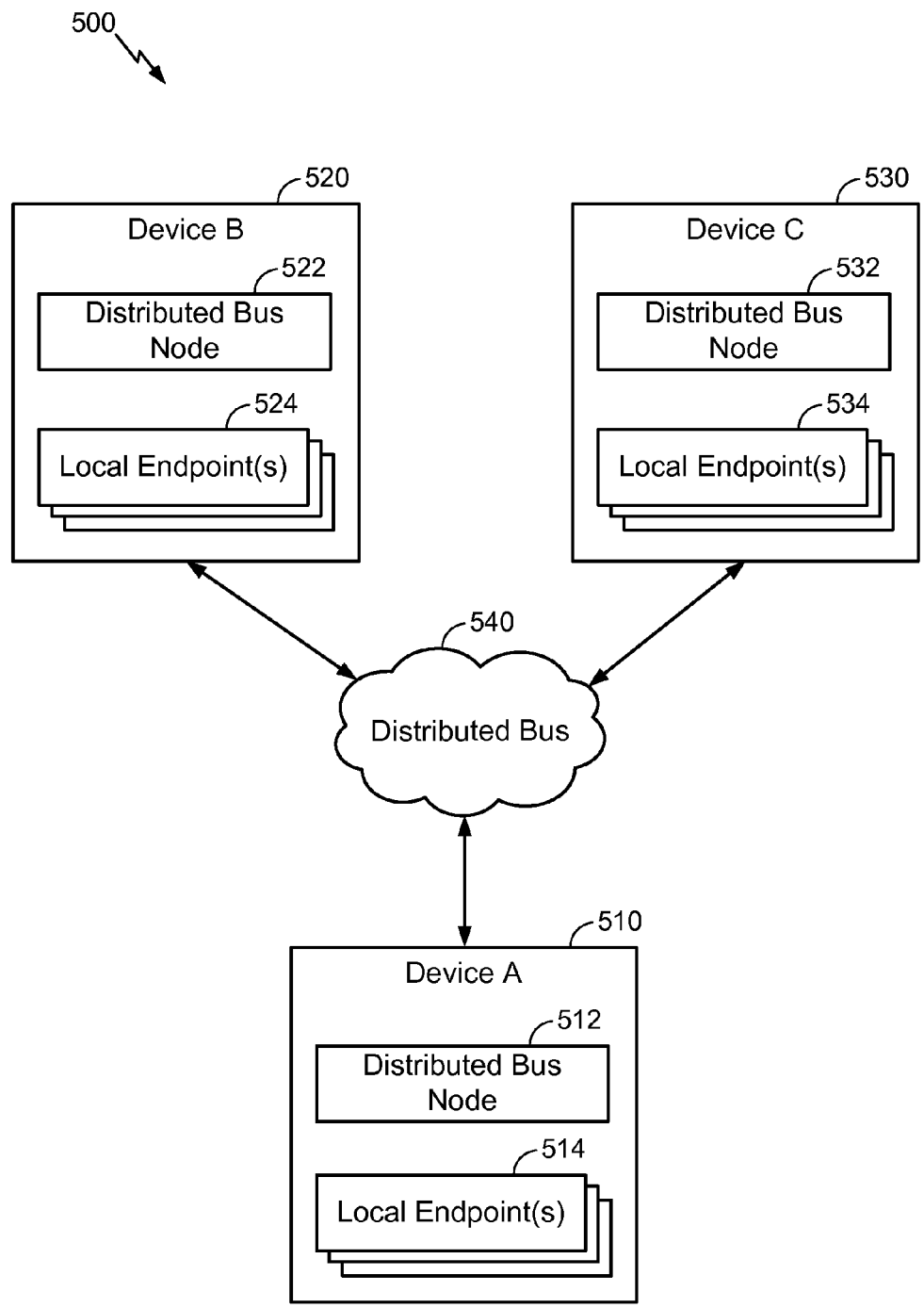
FIG. 5 illustrates an exemplary environment in which discoverable P2P services may be used to establish a proximity-based distributed bus over which various devices may communicate, according to various aspects described herein.

According to one aspect of the disclosure, FIG. 5 illustrates an exemplary environment 500 in which discoverable P2P services may be used to establish a proximity-based distributed bus over which various devices 510, 520, 530 may communicate. For example, in one embodiment, communications between applications and the like, on a single platform may be facilitated using an interprocess communication protocol (IPC) framework over the distributed bus 540, which may comprise a software bus used to enable application-to-application communications in a networked computing environment where applications register with the distributed bus 540 to offer services to other applications and other applications query the distributed bus 540 for information about registered applications. Such a protocol may provide asynchronous notifications and remote procedure calls (RPCs) in which signal messages (e.g., notifications) may be point-to-point or broadcast, method call messages (e.g., RPCs) may be synchronous or asynchronous, and the distributed bus 540 may handle message routing between the various devices 510, 520, 530 (e.g., via one or more bus routers or "daemons" or other suitable processes that may provide attachments to the distributed bus 540).

In one embodiment, the distributed bus 540 may be supported by a variety of transport protocols (e.g., Bluetooth, TCP/IP, Wi-Fi, CDMA, GPRS, UMTS, etc.). For example, according to one aspect, a first device 510 may include a distributed bus node 512 and one or more local endpoints 514, wherein the distributed bus node 512 may facilitate communications between local endpoints 514 associated with the first device 510 and local endpoints 524 and 534 associated with a second device 520 and a third device 530 through the distributed bus 540 (e.g., via distributed bus nodes 522 and 532 on the second device 520 and the third device 530). As will be described in further detail below with reference to FIG. 6, the distributed bus 540 may support symmetric multi-device network topologies and may provide a robust operation in the presence of device drops-outs. As such, the virtual distributed bus 540, which may generally be independent from any underlying transport protocol (e.g., Bluetooth, TCP/IP, Wi-Fi, etc.) may allow various security options, from unsecured (e.g., open) to secured (e.g., authenticated and encrypted), wherein the security options can be used while facilitating spontaneous connections with among the first device 510, the second device 520, and the third device 530 without intervention when the various devices 510, 520, 530 come into range or proximity to each other.

Figure 6:
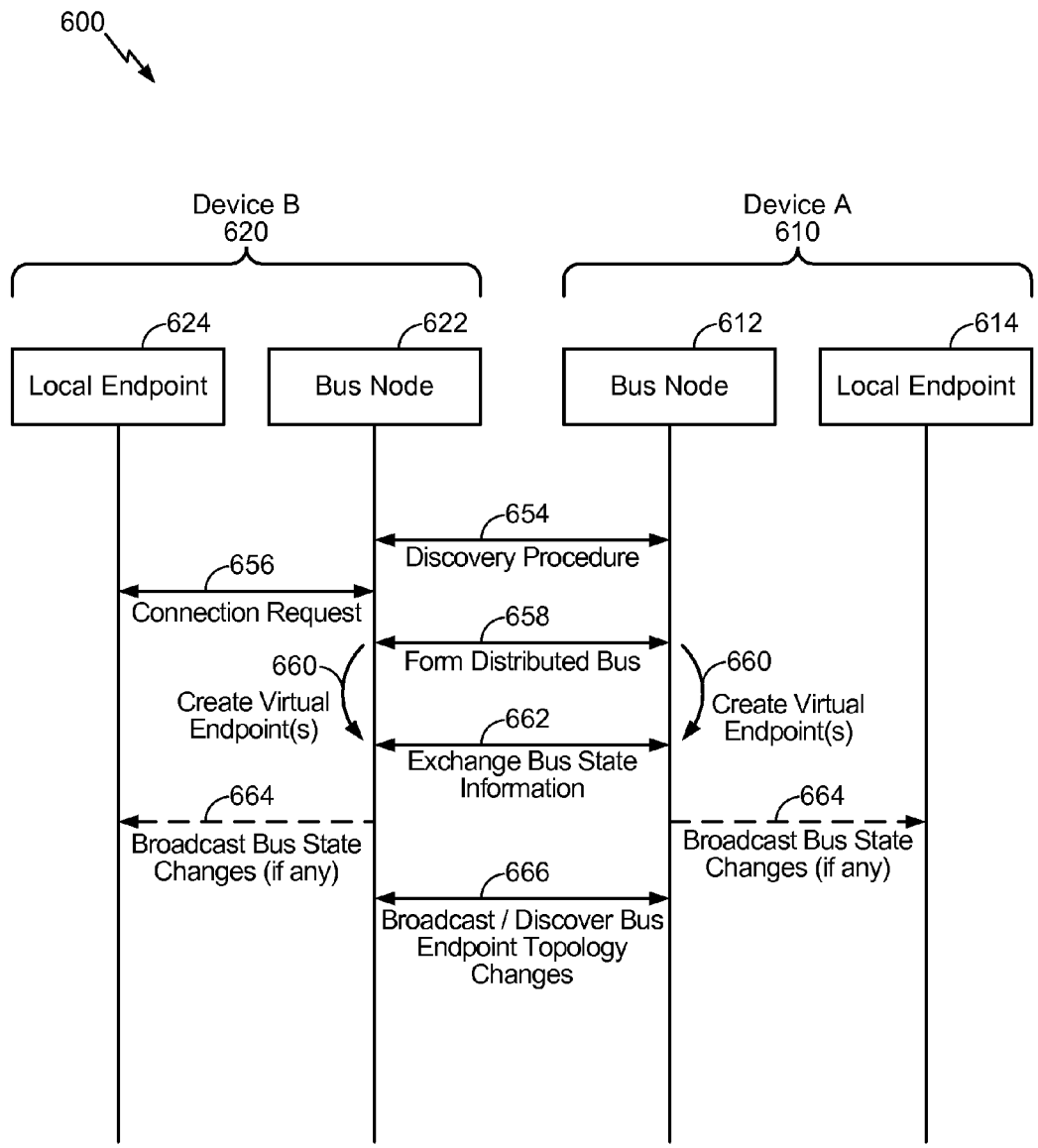
FIG. 6 illustrates an exemplary signaling flow in which discoverable P2P services may be used to establish a proximity-based distributed bus over which various devices may communicate, according to various aspects described herein.

According to one aspect of the disclosure, FIG. 6 illustrates an exemplary signaling flow 600 in which discoverable P2P services may be used to establish a proximity-based distributed bus over which a first device ("Device A") 610 and a second device ("Device B") 620 may communicate. Generally, Device A 610 may request to communicate with Device B 620, wherein Device A 610 may a include local endpoint 614 (e.g., a local application, service, etc.), which may make a request to communicate in addition to a bus node 612 that may assist in facilitating such communications. Further, Device B 620 may include a local endpoint 624 with which the local endpoint 614 may be attempting to communicate in addition to a bus node 622 that may assist in facilitating communications between the local endpoint 614 on the Device A 610 and the local endpoint 624 on Device B 620.

In one embodiment, the bus nodes 612 and 622 may perform a suitable discovery mechanism at 654. For example, mechanisms for discovering connections supported by Bluetooth, TCP/IP, UNIX, or the like may be used. At 656, the local endpoint 614 on Device A 610 may request to connect to an entity, service, endpoint etc., available through bus node 612. In one embodiment, the request may include a request-and-response process between local endpoint 614 and bus node 612. At 658, a distributed message bus may be formed to connect bus node 612 to bus node 622 and thereby establish a P2P connection between Device A 610 and Device B 620. In one embodiment, communications to form the distributed bus between the bus nodes 612 and 622 may be facilitated using a suitable proximity-based P2P protocol (e.g., the AllJoyn™ software framework designed to enable interoperability among connected products and software applications from different manufacturers to dynamically create proximal networks and facilitate proximal P2P communication). Alternatively, in one embodiment, a server (not shown) may facilitate the connection between the bus nodes 612 and 622. Furthermore, in one embodiment, a suitable authentication mechanism may be used prior to forming the connection between bus nodes 612 and 622 (e.g., SASL authentication in which a client may send an authentication command to initiate an authentication conversation). Still further, during 658, bus nodes 612 and 622 may exchange information about other available endpoints (e.g., local endpoints 534 on Device C 530 in FIG. 5). In such embodiments, each local endpoint that a bus node maintains may be advertised to other bus nodes, wherein the advertisement may include unique endpoint names, transport types, connection parameters, or other suitable information.

In one embodiment, at 660, bus node 612 and bus node 622 may use obtained information associated with the local endpoints 624 and 614, respectively, to create virtual endpoints that may represent the real obtained endpoints available through various bus nodes. In one embodiment, message routing on the bus node 612 may use real and virtual endpoints to deliver messages. Further, there may one local virtual endpoint for every endpoint that exists on remote devices (e.g., Device A 610). Still further, such virtual endpoints may multiplex and/or de-multiplex messages sent over the distributed bus (e.g., a connection between bus node 612 and bus node 622). In one aspect, virtual endpoints may receive messages from the local bus node 612 or 622, just like real endpoints, and may forward messages over the distributed bus. As such, the virtual endpoints may forward messages to the local bus nodes 612 and 622 from the endpoint multiplexed distributed bus connection. Furthermore, in one embodiment, virtual endpoints that correspond to virtual endpoints on a remote device may be reconnected at any time to accommodate desired topologies of specific transport types. In such an aspect, UNIX based virtual endpoints may be considered local and as such may not be considered candidates for reconnection. Further, TCP-based virtual endpoints may be optimized for one hop routing (e.g., each bus node 612 and 622 may be directly connected to each other). Still further, Bluetooth-based virtual endpoints may be optimized for a single pico-net (e.g., one master and n slaves) in which the Bluetooth-based master may be the same bus node as a local master node.

At 662, the bus node 612 and the bus node 622 may exchange bus state information to merge bus instances and enable communication over the distributed bus. For example, in one embodiment, the bus state information may include a well-known to unique endpoint name mapping, matching rules, routing group, or other suitable information. In one embodiment, the state information may be communicated between the bus node 612 and the bus node 622 instances using an interface with local endpoints 614 and 624 communicating with using a distributed bus based local name. In another aspect, bus node 612 and bus node 622 may each may maintain a local bus controller responsible for providing feedback to the distributed bus, wherein the bus controller may translate global methods, arguments, signals, and other information into the standards associated with the distributed bus. At 664, the bus node 612 and the bus node 622 may communicate (e.g., broadcast) signals to inform the respective local endpoints 614 and 624 about any changes introduced during bus node connections, such as described above. In one embodiment, new and/or removed global and/or translated names may be indicated with name owner changed signals. Furthermore, global names that may be lost locally (e.g., due to name collisions) may be indicated with name lost signals. Still further, global names that are transferred due to name collisions may be indicated with name owner changed signals and unique names that disappear if and/or when the bus node 612 and the bus node 622 become disconnected may be indicated with name owner changed signals.

As used above, well-known names may be used to uniquely describe local endpoints 614 and 624. In one embodiment, when communications occur between Device A 610 and Device B 620, different well-known name types may be used. For example, a device local name may exist only on the bus node 612 associated with Device A 610 to which the bus node 612 directly attaches. In another example, a global name may exist on all known bus nodes 612 and 622, where only one owner of the name may exist on all bus segments. In other words, when the bus node 612 and bus node 622 are joined and any collisions occur, one of the owners may lose the global name. In still another example, a translated name may be used when a client is connected to other bus nodes associated with a virtual bus. In such an aspect, the translated name may include an appended end (e.g., a local endpoint 614 with well-known name "org.foo" connected to the distributed bus with Globally Unique Identifier "1234" may be seen as "G1234.org.foo").

At 666, the bus node 612 and the bus node 622 may communicate (e.g., broadcast) signals to inform other bus nodes of changes to endpoint bus topologies. Thereafter, traffic from local endpoint 614 may move through virtual endpoints to reach intended local endpoint 624 on Device B 620. Further, in operation, communications between local endpoint 614 and local endpoint 624 may use routing groups. In one aspect, routing groups may enable endpoints to receive signals, method calls, or other suitable information from a subset of endpoints. As such, a routing name may be determined by an application connected to a bus node 612 or 622. For example, a P2P application may use a unique, well-known routing group name built into the application. Further, bus nodes 612 and 622 may support registering and/or de-registering of local endpoints 614 and 624 with routing groups. In one embodiment, routing groups may have no persistence beyond a current bus instance. In another aspect, applications may register for their preferred routing groups each time they connect to the distributed bus. Still further, groups may be open (e.g., any endpoint can join) or closed (e.g., only the creator of the group can modify the group). Yet further, a bus node 612 or 622 may send signals to notify other remote bus nodes or additions, removals, or other changes to routing group endpoints. In such embodiments, the bus node 612 or 622 may send a routing group change signal to other group members whenever a member is added and/or removed from the group. Further, the bus node 612 or 622 may send a routing group change signal to endpoints that disconnect from the distributed bus without first removing themselves from the routing group.

Figure 7A:
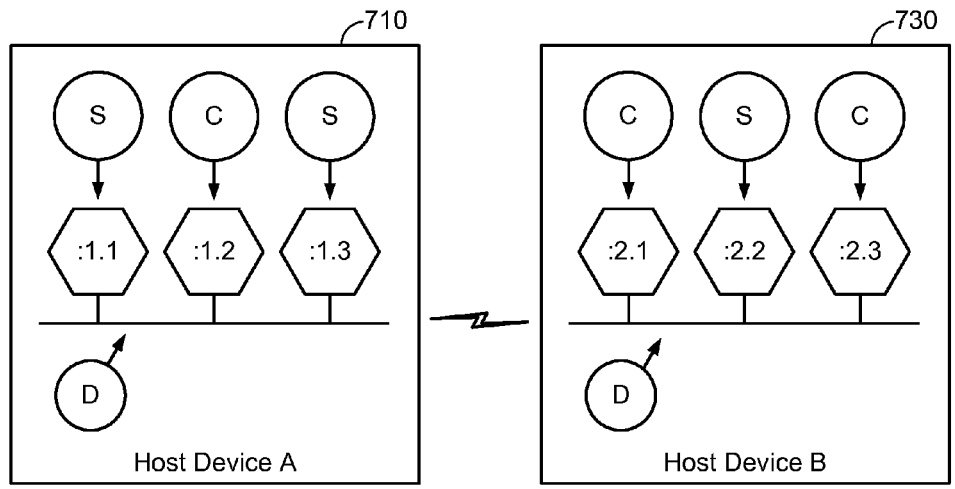
FIG. 7A illustrates an exemplary proximity-based distributed bus that may be formed between two host devices and FIG. 7B illustrates an exemplary proximity-based distributed bus in which one or more embedded devices can connect to a host device to join the proximity-based distributed bus, according to various aspects described herein.

According to one aspect of the disclosure, FIG. 7A illustrates an exemplary proximity-based distributed bus that may be formed between a first host device 710 and a second host device 730. More particularly, as described above with respect to FIG. 5, the basic structure of the proximity-based distributed bus may comprise multiple bus segments that reside on separate physical host devices. Accordingly, in FIG. 7A, each segment of the proximity-based distributed bus may be located on one of the host devices 710, 730, wherein the host devices 710, 730 each execute a local bus router (or "daemon") that may implement the bus segments located on the respective host device 710, 730. For example, in FIG. 7A, each host device 710, 730 includes a bubble labeled "D" to represent the bus router that implements the bus segments located on the respective host device 710, 730. Furthermore, one or more of the host devices 710, 730 may have several bus attachments, where each bus attachment connects to the local bus router. For example, in FIG. 7A, the bus attachments on host devices 710, 730 are illustrated as hexagons that each correspond to either a service (S) or a client (C) that may request a service.

Figure 7B:
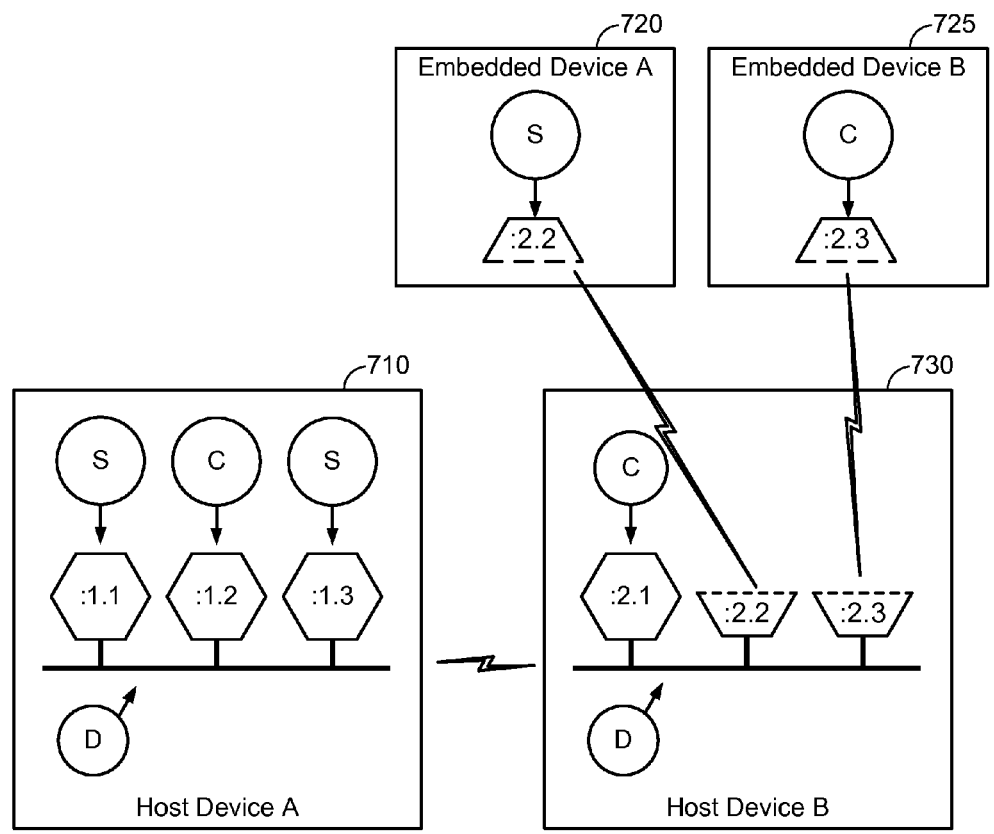

However, in certain cases, embedded devices may lack sufficient resources to run a local bus router. Accordingly, FIG. 7B illustrates an exemplary proximity-based distributed bus in which one or more embedded devices 720, 725 can connect to a host device (e.g., host device 730) to connect to the proximity-based distributed bus. As such, the embedded devices 720, 725 may generally "borrow" the bus router running on the host device 730, whereby FIG. 7B shows an arrangement where the embedded devices 720, 725 are physically separate from the host device 730 running the borrowed bus router that manages the distributed bus segment on which the embedded devices 720, 725 reside. In general, the connection between the embedded devices 720, 725 and the host device 730 may be made according to the Transmission Control Protocol (TCP) and the network traffic flowing between the embedded devices 720, 725 and the host device 730 may comprise messages that implement bus methods, bus signals, and properties flowing over respective sessions in a similar manner to that described in further detail above with respect to FIGS. 5 and 6. In particular, the embedded devices 720, 725 may connect to the host device 730 according to a discovery and connection process that may be conceptually similar to the discovery and connection process between clients and services, wherein the host device 730 may advertise a well-known name (e.g., "org.alljoyn.BusNode") that signals an ability or willingness to host the embedded devices 720, 725. In one use case, the embedded devices 720, 725 may simply connect to the "first" host device that advertises the well-known name. However, if the embedded devices 720, 725 simply connect to the first host device that advertises the well-known name, the embedded devices 720, 725 may not have any knowledge about the type associated with the host device (e.g., whether the host device 730 is a mobile device, a set-top box, an access point, etc.), nor would the embedded devices 720, 725 have any knowledge about the load status on the host device. Accordingly, in other use cases, the embedded devices 720, 725 may adaptively connect to the host device 730 based on information that the host devices 710, 730 provide when advertising the ability or willingness to host other devices (e.g., embedded devices 720, 725), which may thereby join the proximity-based distributed bus according to properties associated with the host devices 710, 730 (e.g., type, load status, etc.) and/or requirements associated with the embedded devices 720, 725 (e.g., a ranking table that expresses a preference to connect to a host device from the same manufacturer).

Having provided the above background, the entrusted device localization scheme that may be used in connection with the various aspects and embodiments mentioned above will now be described in more detail.

Figure 8:
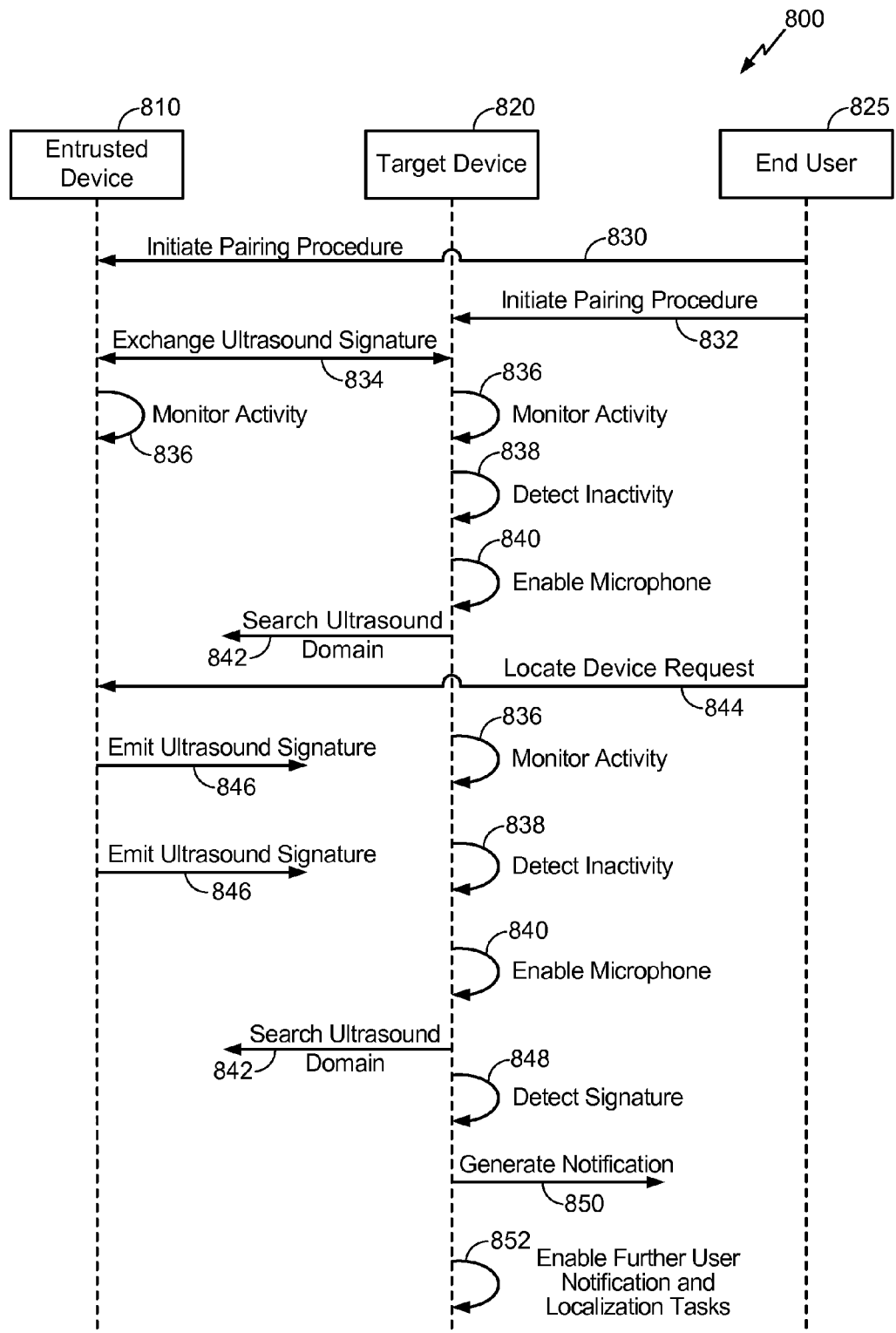
FIG. 8 illustrates an exemplary signaling flow that may implement an entrusted device localization scheme in which ultrasound signatures exchanged among entrusted devices can be used to locate a target device, according to various aspects described herein.

More particularly, according to various aspects, FIG. 8 illustrates an exemplary signaling flow 800 that may implement an entrusted device localization scheme using ultrasound signatures. In various embodiments, at 830 and 832, an end user 825 may initiate a pairing procedure between an entrusted device 810 and a target device 820, wherein the entrusted device 810 and the target device 820 may comprise smartphones, devices, or other suitable objects associated with a particular network or other environment (e.g., a household). For example, in various embodiments, the pairing procedure between the entrusted device 810 and the target device 820 may comprise a near-field communication (NFC) pairing procedure, a Bluetooth pairing procedure, an e-mail pairing procedure, a pairing procedure associated with a proximity-based peer-to-peer communication protocol, or another pairing procedure that may establish a private and trusted relationship between the entrusted device 810 and the target device 820. In various embodiments, at 834, the entrusted device 810 and the target device 820 may perform the pairing procedure initiated by the end user 825, wherein an outcome from the pairing procedure may allow the entrusted device 810 and the target device 820 to exchange a single communication key or other suitable private pre-shared key (PSK). For example, at 834, the communication key exchanged between the entrusted device 810 and the target device 820 may comprise a unique and inaudible ultrasound signature. However, those skilled in the art will appreciate that the communication key exchanged between the entrusted device 810 and the target device 820 may comprise any suitable unique audio signature that the entrusted device 810 and the target device 820 can emit and detect.

In various embodiments, at 836, the entrusted device 810 and the target device 820 may then monitor respective activity associated therewith to determine whether or not the entrusted device 810 and the target device 820 are in use. For example, in various embodiments, the entrusted device 810 and the target device 820 may include on-board accelerometers or other suitable sensors that can detect inflicted motion or other suitable metrics that may indicate a usage state associated therewith. In another example, the entrusted device 810 and the target device 820 may be configured to monitor activity associated with a processor to determine whether or not the end user 825 may be engaging in activity that may not be indicated via inflicted motion or other suitable motion metrics (e.g., a stationary device may be used to play a movie and therefore have detectable activity that may not be indicated via motion sensors). In any case, at 836, the entrusted device 810 and the target device 820 may monitor the respective activity associated therewith to detect an inactive state and thereby determine whether to initiate the localization scheme disclosed herein. For example, in FIG. 8, the entrusted device 810 may determine that the activity monitored at 836 indicates an active state, whereas the target device 820 may determine that the activity monitored at 836 indicates an inactive state. In the latter case, the target device 820 may detect the inactive state at 838, turn on a microphone or other audio capture device at periodic intervals at 840, and search an ultrasound domain to detect the previously exchanged ultrasound signature at 842.

In various embodiments, the inactivity associated with the target device 820 may result from the end user 825 losing or otherwise misplacing the target device 820, whereby the end user 825 may then use the entrusted device 810 previously paired with the target device 820 in an attempt to locate or otherwise find the target device 820. More particularly, at 844, the end user 825 may provide a request to locate the target device 820 to the entrusted device 810, wherein at 846, the entrusted device may emit the unique ultrasound signature that the entrusted device 810 previously exchanged with the target device 820. As such, the target device 820 may regularly turn on the microphone or other audio capture device associated therewith at 840 and eventually detect the unique ultrasound signature emitted from the target device 810 in the searched ultrasound domain at 842. In response to detecting the emitted ultrasound signature at 848, the target device 810 may generate an audible or visual notification in a user domain at 850 (e.g., a notification that the end user 825 can perceive, whereas the unique ultrasound signature may be inaudible to the end user 825), wherein the notification in the user domain may assist the end user 825 in locating the target device 820. For example, the notification that the target device 820 generates in response to detecting the ultrasound signature emitted from the entrusted device 810 may comprise an audio response (e.g., "I am here," a distinct sound pattern, etc.), a light response (e.g., turning on a display screen, flashing an LED, etc.) or any other suitable notification that may assist the end user 825 in locating the target device 820. Furthermore, in various embodiments, the target device 810 may enable more sophisticated user notification and localization tasks at 822 in response to detecting the ultrasound signature emitted from the entrusted device 810. For example, the more sophisticated user notification and localization tasks may include triangulation schemes, reporting a last known GPS location to a trusted entity, or other suitable localization tasks.

Accordingly, relative to conventional localization schemes that employ RF signals, GPS schemes, or other triangulation schemes, the localization scheme described above may employ ultrasound signals that can be emitted and detected in indoor environments. Moreover, because ultrasound signals can be emitted and detected over relatively short ranges (e.g., typically between two and five meters) in a periodic or otherwise sporadic manner, the localization scheme based thereon may consume substantially less power than conventional localization schemes. Furthermore, the pairing procedure between the entrusted device 810 and the target device 820 may advantageously offer security and privacy because the target device 820 may only generate notifications to indicate or otherwise suggest the location associated therewith in response to detecting ultrasound signatures that were exchanged with paired (trusted) devices. As such, the localization scheme based on ultrasound signatures may pose little to no security risk that someone may use the technology to randomly seek lost devices because unauthorized users would not have any way to learn the unique ultrasound signature.

Figure 9:
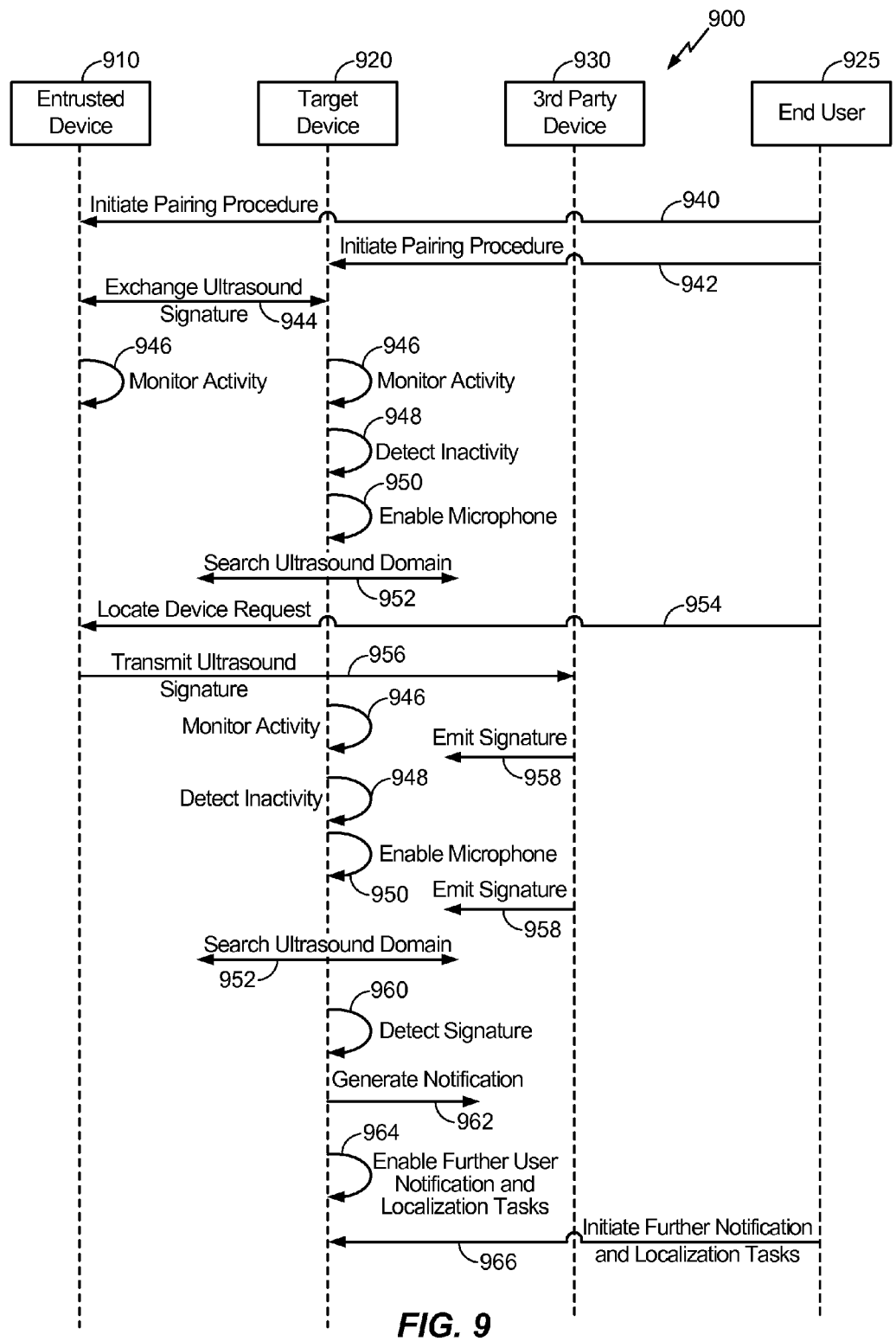
FIG. 9 illustrates an exemplary signaling flow in which a third party device may be authorized to locate a target device using an ultrasound signature exchanged among entrusted devices, according to various aspects described herein.

According to one aspect of the disclosure, FIG. 9 illustrates another exemplary signaling flow 900 that may implement an entrusted device localization scheme using ultrasound signatures, wherein the signaling flow 900 shown in FIG. 9 may enable an authorized third party to locate a target device using the entrusted device localization scheme. In general, the signaling flow 900 shown in FIG. 9 may have substantially similar characteristics to the signaling flow 800 shown in FIG. 8 and described in further detail above. For example, the signaling flow 900 shown in FIG. 9 may similarly involve an end user 925 initiating a pairing procedure between an entrusted device 910 and a target device 920 that allows the entrusted device 910 and the target device 920 to exchange a unique ultrasound signature such that the entrusted device 910 and/or the target device 920 may periodically enable a microphone or other audio capture device to search an ultrasound domain in response to detecting an inactive state. As such, for brevity and ease of description, various details relating to the signaling flow 900 shown in FIG. 9 may be omitted herein to the extent that the same or similar details have already been provided above with respect to FIG. 8.

However, the signaling flow 900 shown in FIG. 9 may differ from the signaling flow 800 shown in FIG. 8 in that the signaling flow 900 shown in FIG. 9 may be used to authorize a third party device 930 (or another remote device) to emit the ultrasound signature and thereby grant the third party device 930 the ability to locate the (misplaced) target device 920 even though the third party device 930 may not have been paired with the target device 920. For example, in certain scenarios, the end user 925 may believe that the target device 920 was misplaced in a certain location (e.g., a taxi) and therefore wish to authorize the third party device 930 to emit the ultrasound signature and thereby assist with locating the target device 920 to determine whether the target device 920 was actually misplaced in that location. For example, at 954, the end user 925 may initially transmit the request to locate the target device 920 to the entrusted device 910 that was paired with the target device 920, and at 956, the entrusted device 910 may then transmit the ultrasound signature that was exchanged with the target device 920 to the third party device 930 that has been authorized to emit the ultrasound signature. Alternatively, in certain implementations, a server (not shown) may control authorizing the third party device 930 and/or transmitting the ultrasound signature to the third party device 930. In either case, upon receiving the ultrasound signature and appropriate authorization, the third party device 930 may then emit the ultrasound signature at 958. Accordingly, the target device 920 may periodically turn on the microphone or other audio capture device at 950, search the ultrasound domain at 952, and eventually detect the ultrasound signature in the ultrasound domain at 960, in response to which the target device 920 may generate a notification in the user domain at 962 in a substantially similar manner to implementations in which the entrusted device 910 emits the ultrasound signature. In this manner, despite not having been paired with the lost or otherwise misplaced target device 920, the third party device 930 may be used to confirm whether or not the target device 920 was actually misplaced in the corresponding location such that the end user 925 can initiate further notification and localization tasks at 966.

Figure 10:
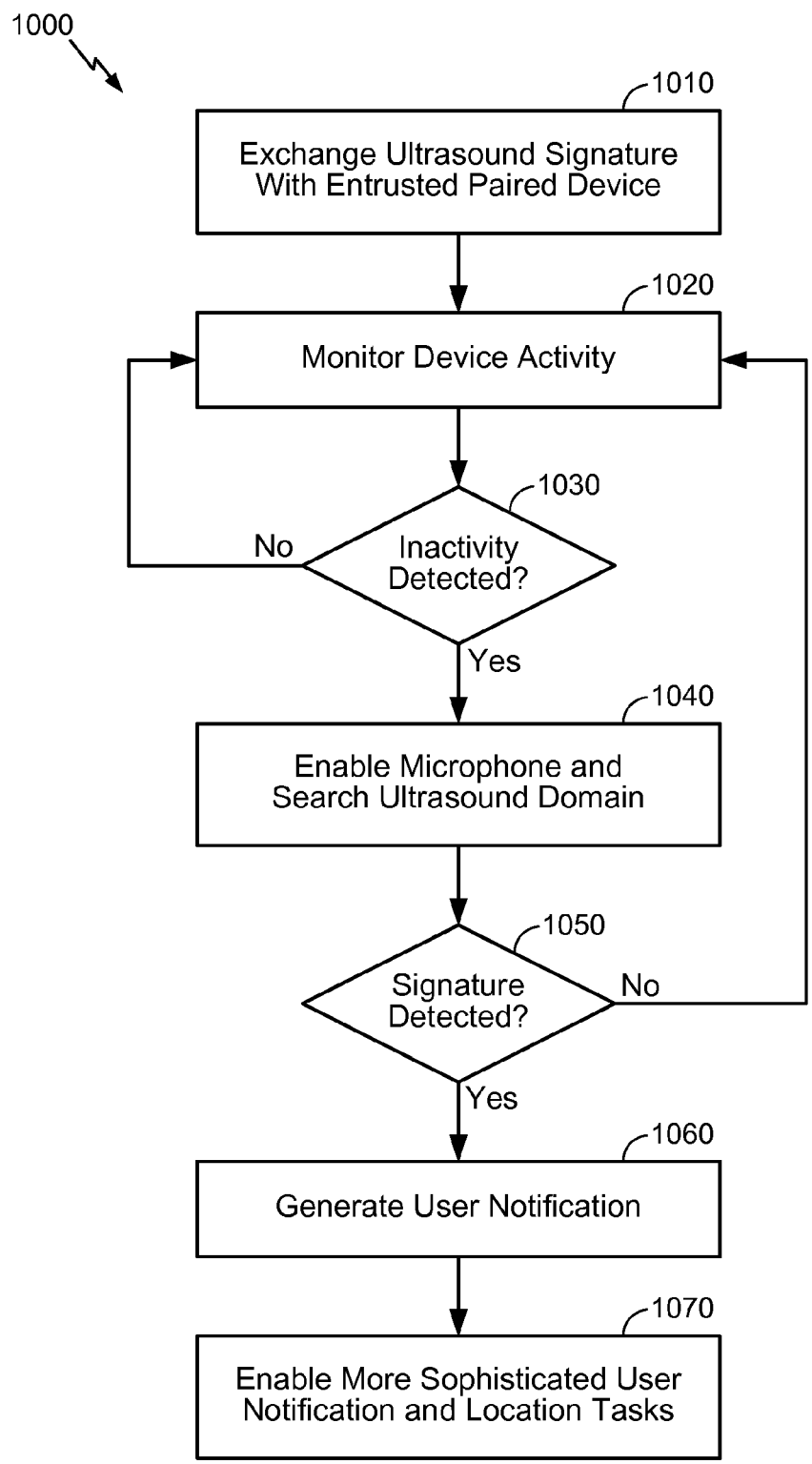
FIG. 10 illustrates an exemplary method that may be used to locate a lost device according to an entrusted device localization scheme using ultrasound signatures, according to various aspects described herein.

According to one aspect of the disclosure, FIG. 10 illustrates an exemplary method 1000 that may locate a lost or otherwise misplaced device that implements an entrusted device localization scheme using ultrasound signatures, wherein the method 1000 shown in FIG. 10 may generally correspond to functions that are performed at a target device that subsequently becomes lost or otherwise misplaced. More particularly, at block 1010, an end user may initiate a pairing procedure between an entrusted device and the target device, wherein the entrusted device and the target device may comprise smartphones, devices, or other suitable objects associated with a particular network or other environment (e.g., a household). For example, in various embodiments, the pairing procedure between the entrusted device and the target device may comprise an NFC pairing procedure, a Bluetooth pairing procedure, an e-mail pairing procedure, a proximity-based peer-to-peer pairing procedure, or any other suitable pairing procedure that may establish a private and trusted relationship between the entrusted device and the target device. In various embodiments, the entrusted device and the target device that are paired with one another may then exchange a unique and inaudible ultrasound signature.

In various embodiments, the target device may then monitor activity associated therewith at block 1020 and determine whether or not an inactive state has been detected at block 1030. For example, in various embodiments, the target device may include an on-board accelerometer or other suitable sensors that can detect inflicted motion or other suitable metrics that may indicate a usage state associated therewith. In another example, the target device may be configured to monitor activity associated with a processor to determine whether or not the end user may be engaging in activity that may not be indicated via inflicted motion or other suitable motion metrics. In any case, the target device may monitor the activity associated therewith at block 1020 and periodically check whether an inactive state has been detected at block 1030 to thereby determine whether to initiate the localization scheme disclosed herein. For example, in response to the target device determining that the monitored activity associated therewith indicates an inactive state at block 1030, the target device may enable a microphone or other audio capture device and search an ultrasound domain at block 1040 to determine whether the previously exchanged ultrasound signature was detected in the ultrasound domain at block 1050. In response to determining that the ultrasound signature was not detected, the target device may continue to monitor the activity associated therewith at block 1020 and perform a subsequent search in the ultrasound domain in response to detecting an inactive state again in the next iteration. Otherwise, in response to detecting the ultrasound signature at block 1050, the target device may generate an audible or visual notification in a user domain at block 1060. For example, the notification in the user domain may generally comprise a notification that the end user can perceive, whereas the unique ultrasound signature exchanged with the entrusted device may be inaudible to the end user. Furthermore, the target device may enable more sophisticated user notification and localization tasks at block 1070 in response to detecting the ultrasound signature at block 1050.

Figure 11:
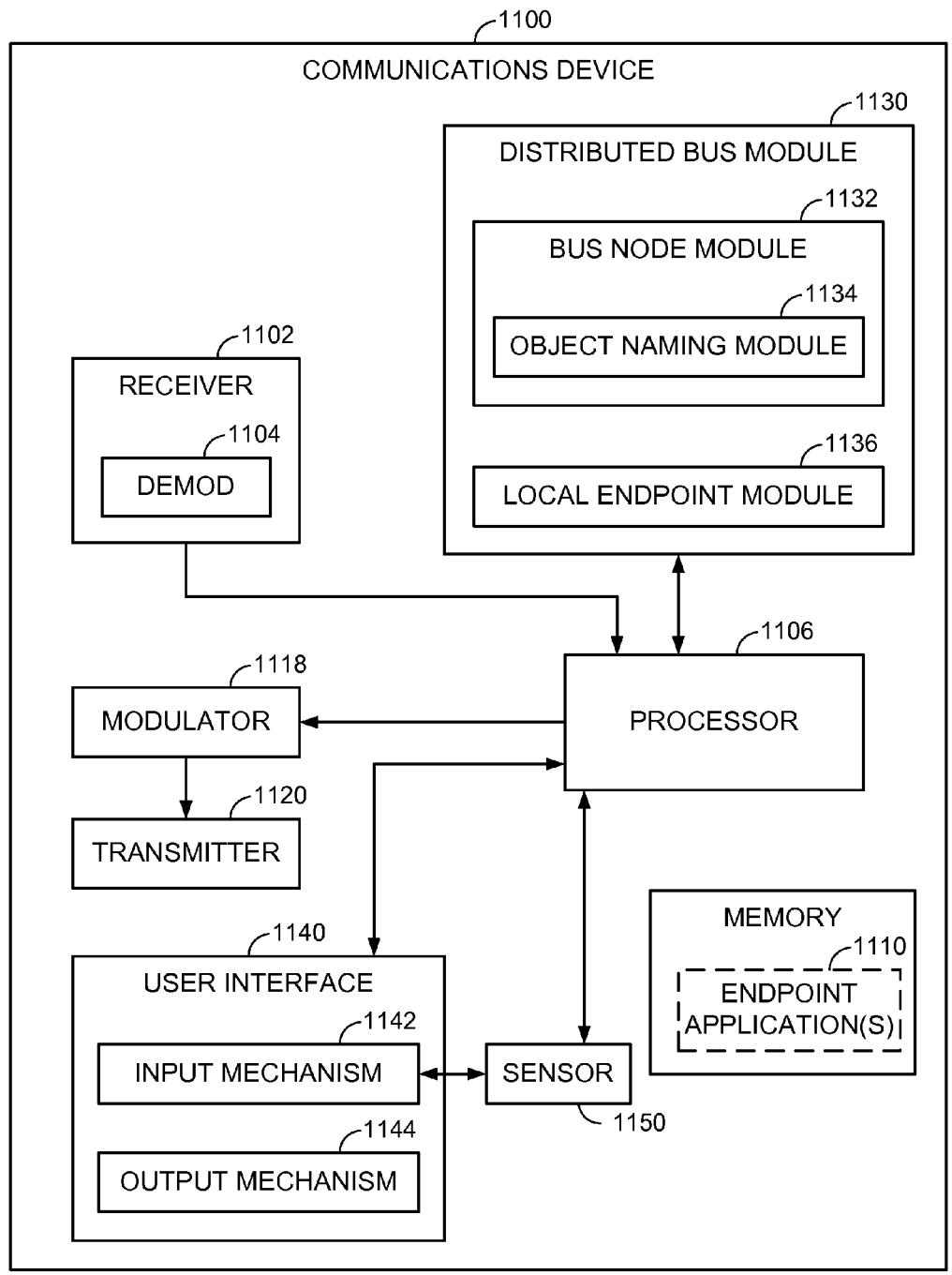
FIG. 11 illustrates an exemplary device that may communicate over a proximity-based distributed bus in relation to an entrusted device localization scheme that uses ultrasound signatures, according to various aspects described herein.

According to one aspect of the disclosure, FIG. 11 illustrates an exemplary communications device 1100 that may communicate over a proximity-based distributed bus using discoverable P2P services in accordance with the various aspects and embodiments disclosed herein. In particular, as shown in FIG. 11, the communications device 1100 may comprise a receiver 1102 that may receive a signal from, for instance, a receive antenna (not shown), perform typical actions on the received signal (e.g., filtering, amplifying, downconverting, etc.), and digitize the conditioned signal to obtain samples. The receiver 1102 can comprise a demodulator 1104 that can demodulate received symbols and provide them to a processor 1106 for channel estimation. The processor 1106 can be dedicated to analyzing information received by the receiver 1102 and/or generating information for transmission by a transmitter 1120, control one or more components of the communications device 1100, and/or any suitable combination thereof.

In various embodiments, the communications device 1100 can additionally comprise a memory 1108 operatively coupled to the processor 1106, wherein the memory 1108 can store received data, data to be transmitted, information related to available channels, data associated with analyzed signal and/or interference strength, information related to an assigned channel, power, rate, or the like, and any other suitable information for estimating a channel and communicating via the channel. In one aspect, the memory 1108 can include one or more local endpoint applications 1110, which may seek to communicate with endpoint applications, services, etc., on the communications device 1100 and/or other communications devices (not shown) through a distributed bus module 1130. The memory 1108 can additionally store protocols and/or algorithms associated with estimating and/or utilizing a channel (e.g., performance based, capacity based, etc.).

Those skilled in the art will appreciate that the memory 1108 and/or other data stores described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1108 in the subject systems and methods may comprise, without being limited to, these and any other suitable types of memory.

In various embodiments, the distributed bus module 1130 associated with the communications device 1100 can further facilitate establishing connections with other devices. The distributed bus module 1130 may further comprise a bus node module 1132 to assist the distributed bus module 1130 with managing communications between multiple devices. In one aspect, the bus node module 1132 may further include an object naming module 1134 to assist the bus node module 1132 in communicating with endpoint applications associated with other devices. Still further, the distributed bus module 1130 may include an endpoint module 1136 to assist the local endpoint applications 1110 in communicating with other local endpoints and/or endpoint applications accessible on other devices through an established distributed bus. In another aspect, the distributed bus module 1130 may facilitate inter-device and/or intra-device communications over multiple available transports (e.g., Bluetooth, UNIX domain-sockets, TCP/IP, Wi-Fi, etc.). Accordingly, in one embodiment, the distributed bus module 1130 and the endpoint applications 1110 may be used to establish and/or join a proximity-based distributed bus over which the communication device 1100 can communicate with other communication devices in proximity thereto using direct device-to-device (D2D) communication.

Additionally, in one embodiment, the communications device 1100 may include a user interface 1140, which may include one or more input mechanisms 1142 for generating inputs into the communications device 1100, and one or more output mechanisms 1144 for generating information for consumption by the user of the communications device 1100. For example, the input mechanisms 1142 may include a mechanism such as a microphone that can be used to receive and/or detect an ultrasound signature or other audio signature used in the entrusted device localization scheme described above in addition to a key or keyboard, mouse, touch-screen display, etc. Further, for example, the output mechanisms 1144 may include a display, an audio speaker, a haptic feedback mechanism, a Personal Area Network (PAN) transceiver etc. In the illustrated aspects, the output mechanisms 1144 may include an audio speaker operable to render media content in an audio form, a display operable to render media content in an image or video format and/or timed metadata in a textual or visual form, or other suitable output mechanisms. However, in one embodiment, a headless communications device 1100 may not include certain input mechanisms 1142 and/or output mechanisms 1144 because headless devices generally refer to computer systems or device that have been configured to operate without a monitor, keyboard, and/or mouse.

Furthermore, in various embodiments, the communications device 1100 may include one or more sensors 1150 that can detect inflicted motion or other suitable metrics that may indicate a usage state associated with the communications device 1100. In another example, activity associated with the processor 1106 may be monitored to determine whether or not an end user is engaging in activity that may not be indicated via inflicted motion or other suitable motion metrics that can be detected with the sensors 1150. In either case, the usage state associated with the communications device 1110 can be monitored such that the microphone or other audio capture input mechanisms 1142 can be activated in response to the monitored activity indicating an inactive state such that an ultrasound domain may be searched to detect the ultrasound signature or other audio signature used in the entrusted device localization scheme and use the one or more output mechanisms 1144 to generate one or more notifications in a user domain to thereby assist with locating the communications device 1110.

Figure 12:
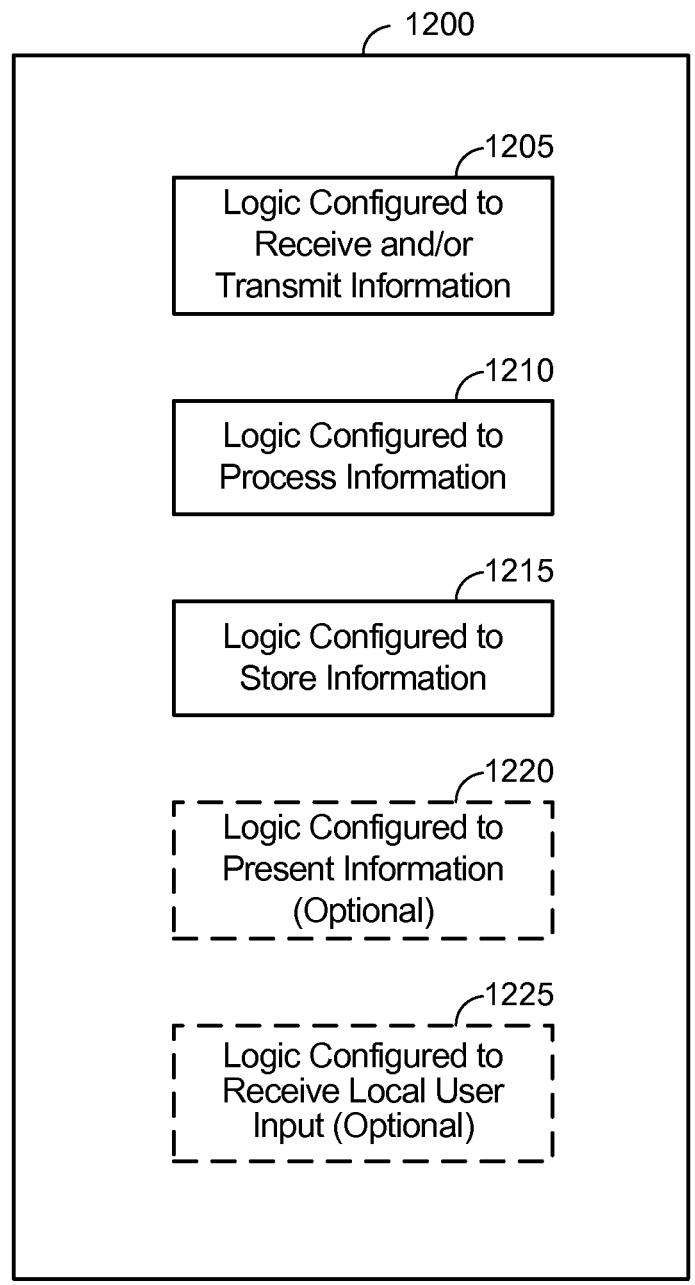
FIG. 12 illustrates an exemplary device that includes logic configured to perform various functions, including functions that relate to an entrusted device localization scheme that uses ultrasound signatures, according to various aspects described herein.

FIG. 12 illustrates a communication device 1200 that includes logic configured to perform functionality. The communication device 1200 can correspond to any of the above-noted communication devices that can be used in the entrusted device localization scheme, including entrusted devices, target devices, third-party devices, or server devices. Thus, the communication device 1200 can correspond to any electronic device that is configured to communicate with (or facilitate communication with) one or more other entities in relation to the entrusted device localization scheme.

Referring to FIG. 12, the communication device 1200 includes logic configured to receive and/or transmit information 1205. In an example, if the communication device 1200 corresponds to a wireless communications device (e.g., wireless devices 200A, 200B, 300), the logic configured to receive and/or transmit information 1205 can include a wireless communications interface (e.g., Bluetooth, Wi-Fi, Wi-Fi Direct, Long-Term Evolution (LTE) Direct, etc.) such as a wireless transceiver and associated hardware (e.g., an RF antenna, a MODEM, a modulator and/or demodulator, etc.). In another example, the logic configured to receive and/or transmit information 1205 can correspond to a wired communications interface (e.g., a serial connection, a USB or Firewire connection, an Ethernet connection through which the Internet 175 can be accessed, etc.). Thus, if the communication device 1200 corresponds to some type of network-based server (e.g., the application 170), the logic configured to receive and/or transmit information 1205 can correspond to an Ethernet card, in an example, that connects the network-based server to other communication entities via an Ethernet protocol. In a further example, the logic configured to receive and/or transmit information 1205 can include sensory or measurement hardware by which the communication device 1200 can monitor its local environment (e.g., an accelerometer, a temperature sensor, a light sensor, an antenna for monitoring local RF signals, etc.). The logic configured to receive and/or transmit information 1205 can also include software that, when executed, permits the associated hardware of the logic configured to receive and/or transmit information 1205 to perform its reception and/or transmission function(s). However, the logic configured to receive and/or transmit information 1205 does not correspond to software alone, and the logic configured to receive and/or transmit information 1205 relies at least in part upon hardware to achieve its functionality.

Referring to FIG. 12, the communication device 1200 further includes logic configured to process information 1210. In an example, the logic configured to process information 1210 can include at least a processor. Example implementations of the type of processing that can be performed by the logic configured to process information 1210 includes but is not limited to performing determinations, establishing connections, making selections between different information options, performing evaluations related to data, interacting with sensors coupled to the communication device 1200 to perform measurement operations, converting information from one format to another (e.g., between different protocols such as .wmv to .avi, etc.), and so on. For example, the processor included in the logic configured to process information 1210 can correspond to a general purpose processor, a DSP, an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration). The logic configured to process information 1210 can also include software that, when executed, permits the associated hardware of the logic configured to process information 1210 to perform its processing function(s). However, the logic configured to process information 1210 does not correspond to software alone, and the logic configured to process information 1210 relies at least in part upon hardware to achieve its functionality.

Referring to FIG. 12, the communication device 1200 further includes logic configured to store information 1215. In an example, the logic configured to store information 1215 can include at least a non-transitory memory and associated hardware (e.g., a memory controller, etc.). For example, the non-transitory memory included in the logic configured to store information 1215 can correspond to RAM, flash memory, ROM, erasable programmable ROM (EPROM), EEPROM, registers, hard disk, a removable disk, a CD-ROM, or any other form of storage medium known in the art. The logic configured to store information 1215 can also include software that, when executed, permits the associated hardware of the logic configured to store information 1215 to perform its storage function(s). However, the logic configured to store information 1215 does not correspond to software alone, and the logic configured to store information 1215 relies at least in part upon hardware to achieve its functionality.

Referring to FIG. 12, the communication device 1200 further optionally includes logic configured to present information 1220. In an example, the logic configured to present information 1220 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 1200 (e.g., a display). In a further example, the logic configured to present information 1220 can be omitted for certain communication devices, such as network communication devices that do not have a local user interface (e.g., network switches or routers, remote servers, etc.). The logic configured to present information 1220 can also include software that, when executed, permits the associated hardware of the logic configured to present information 1220 to perform its presentation function(s). However, the logic configured to present information 1220 does not correspond to software alone, and the logic configured to present information 1220 relies at least in part upon hardware to achieve its functionality.

Referring to FIG. 12, the communication device 1200 further optionally includes logic configured to receive local user input 1225. In an example, the logic configured to receive local user input 1225 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 1200 (e.g., one or more buttons, a display, etc.). In a further example, the logic configured to receive local user input 1225 can be omitted for certain communication devices, such as network communication devices that do not have a local user interface (e.g., network switches or routers, remote servers, etc.). The logic configured to receive local user input 1225 can also include software that, when executed, permits the associated hardware of the logic configured to receive local user input 1225 to perform its input reception function(s). However, the logic configured to receive local user input 1225 does not correspond to software alone, and the logic configured to receive local user input 1225 relies at least in part upon hardware to achieve its functionality.

Referring to FIG. 12, while the configured logics of 1205 through 1225 are shown as separate or distinct blocks in FIG. 12, it will be appreciated that the hardware and/or software by which the respective configured logic performs its functionality can overlap in part. For example, any software used to facilitate the functionality of the configured logics of 1205 through 1225 can be stored in the non-transitory memory associated with the logic configured to store information 1215, such that the configured logics of 1205 through 1225 each performs their functionality (i.e., in this case, software execution) based in part upon the operation of software stored by the logic configured to store information 1215. Likewise, hardware that is directly associated with one of the configured logics can be borrowed or used by other configured logics from time to time. For example, the processor of the logic configured to process information 1210 can format data into an appropriate format before being transmitted by the logic configured to receive and/or transmit information 1205, such that the logic configured to receive and/or transmit information 1205 performs its functionality (i.e., in this case, transmission of data) based in part upon the operation of hardware (i.e., the processor) associated with the logic configured to process information 1210.

Generally, unless stated otherwise explicitly, the phrase "logic configured to" as used throughout this disclosure is intended to invoke an aspect that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

Figure 13:
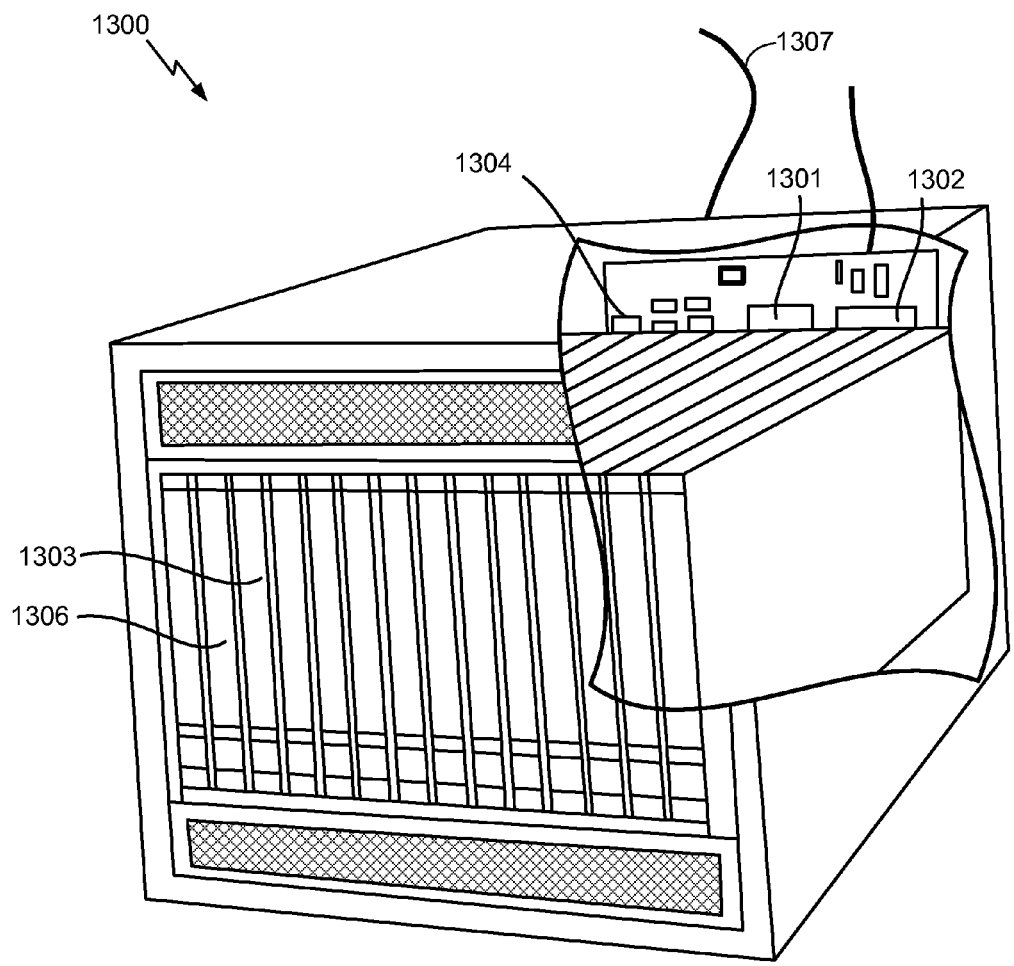
FIG. 13 illustrates an exemplary server that may be used in an entrusted device localization scheme, according to various aspects described herein.

Various aspects and/or embodiments described herein may be implemented on a commercially available server device, such as server 1300 illustrated in FIG. 13. In one example, the server 1300 may correspond to one example configuration of the server 170 described above in relation to FIG. 1A. Accordingly, the server 1300 may provide certain functions that can be used to assist with the entrusted device location scheme described above. For example, in various embodiments, the server 1300 may provide functions to generate and/or store ultrasound signatures or other audio signatures that can be provided to an entrusted device and subsequently exchanged with one or more other user devices. In another example, the server 1300 may provide functions to authorize and/or communicate with third-party devices that may be granted the ability to locate a lost or otherwise misplaced target device using the audio signature that the lost or misplaced device previously exchanged with the entrusted device. In still another example, the server 1300 may be used in relation to more sophisticated user notification and localization tasks that the lost or misplaced user device may enable to assist with locating the lost or misplaced user device in response to detecting the audio signature.

According to various embodiments, the server 1300 shown in FIG. 13 includes a processor 1301 coupled to volatile memory 1302 and a large capacity nonvolatile memory, such as a disk drive 1303. The server 1300 may also include a floppy disc drive, compact disc (CD) or DVD disc drive 1306 coupled to the processor 1301. The server 1300 may also include network access ports 1304 coupled to the processor 1301 for establishing data connections with a network 1307, such as a local area network coupled to other broadcast system computers and servers or to the Internet. In context with FIG. 12, those skilled in the art will appreciate that the server 1300 illustrates one example implementation of the communication device 1200, whereby the logic configured to transmit and/or receive information 1205 may correspond to the network access points 1304 used by the server 1300 to communicate with the network 1307, the logic configured to process information 1210 may correspond to the processor 1301, and the logic configured to store information 1215 may correspond to any combination of the volatile memory 1302, the disk drive 1303 and/or the disc drive 1306. The optional logic configured to present information 1220 and the optional logic configured to receive local user input 1225 are not shown explicitly in FIG. 13 and may or may not be included therein. Accordingly, FIG. 13 helps to demonstrate that the communication device 1200 shown in FIG. 12 may be implemented as a server, in addition to a user device implementation as in FIGS. 2-3 and 11.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a wireless device (e.g., an IoT device). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, DVD, floppy disk and Blu-ray disc where disks usually reproduce data magnetically and/or optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method to locate a device using ultrasound signatures, comprising:
    exchanging, by the device, an ultrasound signature with an entrusted device;
    searching, by the device, an ultrasound domain for the ultrasound signature previously exchanged with the entrusted device in response to detecting an inactive state of the device wherein the inactive state is based at least in part on a lack of inflicted motion and a lack of processor activity at the device; and
    generating, by the device, a user-perceptible notification to assist with locating the device in response to capturing the ultrasound signature previously exchanged with the entrusted device in the searched ultrasound domain.

2. The method recited in claim 1, wherein the ultrasound signature is exchanged with the entrusted device during a pairing procedure.

3. The method recited in claim 1, wherein the entrusted device emits the ultrasound signature in the ultrasound domain.

4. The method recited in claim 1, wherein an authorized unpaired device emits the ultrasound signature in the ultrasound domain.

5. The method recited in claim 1, wherein the user-perceptible notification comprises one or more of an audible notification or a visual notification.

6. The method recited in claim 1, wherein the ultrasound signature exchanged with the entrusted device comprises an inaudible audio signature.

7. The method recited in claim 1, further comprising:
    detecting the inactive state based on one or more measurements that indicate one or more of the inflicted motion or the processor activity at the device.

8. The method recited in claim 1, further comprising:
    enabling one or more user notification and localization tasks to further assist with locating the device in response to detecting the ultrasound signature in the searched ultrasound domain.

9. An apparatus, comprising:
a microphone;
a transceiver configured to exchange an ultrasound signature with an entrusted device;
one or more sensors configured to detect that the apparatus is in an inactive state; and
a processor configured to activate the microphone to search an ultrasound domain for the ultrasound signature previously exchanged with the entrusted device in response to the one or more sensors detecting the inactive state and to generate a user-perceptible notification to assist with locating the apparatus in response to the microphone capturing the ultrasound signature previously exchanged with the entrusted device in the searched ultrasound domain, wherein the inactive state is based at least in part on a lack of inflicted motion associated with the apparatus or activity on the processor of the apparatus.

10. The apparatus recited in claim 9, wherein the transceiver is configured to exchange the ultrasound signature with the entrusted device during a pairing procedure.

11. The apparatus recited in claim 9, wherein one or more of the entrusted device or an authorized unpaired device emits the ultrasound signature that the microphone is configured to capture in the ultrasound domain.

12. The apparatus recited in claim 9, wherein the user-perceptible notification comprises one or more of an audible notification or a visual notification.

13. The apparatus recited in claim 9, wherein the ultrasound signature exchanged with the entrusted device comprises an inaudible audio signature.

14. The apparatus recited in claim 9, wherein the one or more sensors are configured to detect the inactive state based on one or more measurements that indicate one or more of the inflicted motion associated with the apparatus or the activity on the processor.

15. The apparatus recited in claim 9, wherein the processor is further configured to enable one or more user notification and localization tasks to further assist with locating the apparatus in response to the microphone capturing the ultrasound signature in the searched ultrasound domain.

16. An apparatus, comprising:
means for exchanging an ultrasound signature with an entrusted device;
means for searching an ultrasound domain for the ultrasound signature previously exchanged with the entrusted device in response to detecting that the apparatus is in an inactive state, wherein the inactive state is based at least in part on a lack of inflicted motion and a lack of processor activity at the apparatus; and
means for generating a user-perceptible notification to assist with locating the apparatus in response to the means for searching capturing the ultrasound signature previously exchanged with the entrusted device in the searched ultrasound domain.

17. The apparatus recited in claim 16, wherein the means for exchanging is configured to receive the ultrasound signature from the entrusted device during a pairing procedure.

18. The apparatus recited in claim 16, wherein the user-perceptible notification comprises one or more of an audible notification or a visual notification.

19. The apparatus recited in claim 16, wherein the ultrasound signature exchanged with the entrusted device comprises an inaudible audio signature.

20. The apparatus recited in claim 16, further comprising:
means for detecting the inactive state based on one or more measurements that indicate one or more of the inflicted motion or the processor activity associated with the apparatus.

21. The apparatus recited in claim 16, further comprising:
means for enabling one or more user notification and localization tasks to further assist with locating the apparatus in response to detecting the ultrasound signature in the searched ultrasound domain.

22. A non-transitory computer-readable storage medium having computer-executable instructions recorded thereon, wherein executing the computer-executable instructions on a device having one or more processors causes the one or more processors to:
exchange an ultrasound signature with an entrusted device;
search an ultrasound domain for the ultrasound signature previously exchanged with the entrusted device in response to detecting an inactive state of the device, wherein the inactive state is based at least in part on a lack of inflicted motion at the device and a lack of activity on the one or more processors of the device; and
generate a user-perceptible notification to assist with locating the device in response to capturing the ultrasound signature previously exchanged with the entrusted device in the searched ultrasound domain.

23. The non-transitory computer-readable storage medium recited in claim 22, wherein the ultrasound signature is exchanged with the entrusted device during a pairing procedure.

24. The non-transitory computer-readable storage medium recited in claim 22, wherein the user-perceptible notification comprises one or more of an audible notification or a visual notification.

25. The non-transitory computer-readable storage medium recited in claim 22, wherein the ultrasound signature exchanged with the entrusted device comprises an inaudible audio signature.

26. The non-transitory computer-readable storage medium recited in claim 22, wherein executing the computer-executable instructions on the one or more processors further causes the one or more processors to detect the inactive state based on one or more measurements that indicate one or more of the inflicted motion at the device or the activity on the one or more processors of the device.

27. The non-transitory computer-readable storage medium recited in claim 22, wherein executing the computer-executable instructions on the one or more processors further causes the one or more processors to enable one or more user notification and localization tasks to further assist with locating the device in response to detecting the ultrasound signature in the searched ultrasound domain.

* * * * *